(12) United States Patent
Kim et al.

(10) Patent No.: US 9,526,015 B2
(45) Date of Patent: Dec. 20, 2016

(54) METHOD FOR TRANSMITTING AND RECEIVING TRAFFIC INDICATION MAP IN WIRELESS COMMUNICATION SYSTEM AND DEVICE THEREFOR

(71) Applicant: LG ELECTRONICS INC., Seoul (KR)

(72) Inventors: Jeongki Kim, Anyang-si (KR); Jinsam Kwak, Anyang-si (KR); Yongho Seok, Anyang-si (KR); Seunghee Han, Anyang-si (KR); Jinsoo Choi, Anyang-si (KR)

(73) Assignee: LG Electronics Inc., Seoul (KR)

( * ) Notice: Subject to any disclaimer, the term of this patent is extended or adjusted under 35 U.S.C. 154(b) by 28 days.

(21) Appl. No.: 14/390,718

(22) PCT Filed: Apr. 3, 2013

(86) PCT No.: PCT/KR2013/002778
§ 371 (c)(1),
(2) Date: Oct. 3, 2014

(87) PCT Pub. No.: WO2013/151335
PCT Pub. Date: Oct. 10, 2013

(65) Prior Publication Data
US 2015/0092763 A1    Apr. 2, 2015

Related U.S. Application Data

(60) Provisional application No. 61/619,425, filed on Apr. 3, 2012.

(51) Int. Cl.
*H04W 24/02* (2009.01)
*H04W 52/02* (2009.01)
(Continued)

(52) U.S. Cl.
CPC ......... *H04W 24/02* (2013.01); *H04W 52/0216* (2013.01); *H04W 74/00* (2013.01); *H04W 84/12* (2013.01)

(58) Field of Classification Search
None
See application file for complete search history.

(56) References Cited

U.S. PATENT DOCUMENTS

2008/0225768 A1   9/2008   Wentink
2009/0016306 A1   1/2009   Wang et al.
(Continued)

FOREIGN PATENT DOCUMENTS

JP    2005-287040 A    10/2005
JP    2010-114809 A    5/2010
(Continued)

OTHER PUBLICATIONS

Park, Min Young et al., "TGah Efficient TIM Encoding", IEEE 802.11-12/388r1, Mar. 12, 2012.

*Primary Examiner* — Diane Lo
(74) *Attorney, Agent, or Firm* — Dentons US LLP

(57) ABSTRACT

Disclosed are a method for transmitting and receiving a traffic indication map (TIM) in a wireless communication system and a device for supporting the same. More particularly, the method for transmitting a traffic indication map comprises the step of transmitting a TIM to a STA through a beacon frame, wherein the TIM includes: a block bitmap field for indicating a subblock including a STA in which buffered downlink data exists for respective N (N are two or more natural numbers) blocks; and a block control field for indicating an encoding method for the bitmap field.

13 Claims, 34 Drawing Sheets

| Element ID | Length | DTIM Count | DTIM Period | Bitmap Control | Partial Virtual Bitmap |
|---|---|---|---|---|---|
| Octets: 1 | 1 | 1 | 1 | 1 | 1-251 |

(51) Int. Cl.
*H04W 74/00* (2009.01)
*H04W 84/12* (2009.01)

(56) References Cited

U.S. PATENT DOCUMENTS

| | | | |
|---|---|---|---|
| 2010/0265864 A1 | 10/2010 | He et al. | |
| 2013/0128831 A1* | 5/2013 | Calcev | H04W 72/042 |
| | | | 370/329 |
| 2015/0029933 A1* | 1/2015 | Park | H04W 68/005 |
| | | | 370/328 |

FOREIGN PATENT DOCUMENTS

| KR | 10-2007-0045547 A | 5/2007 |
|---|---|---|
| KR | 20090094012 A | 9/2009 |

\* cited by examiner

FIG. 13
(a) 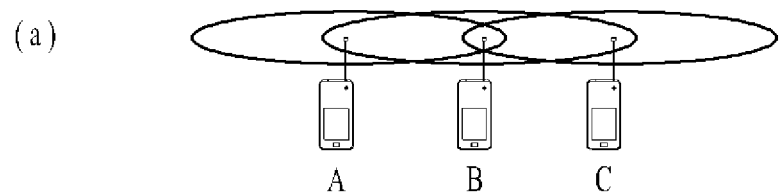
(b) 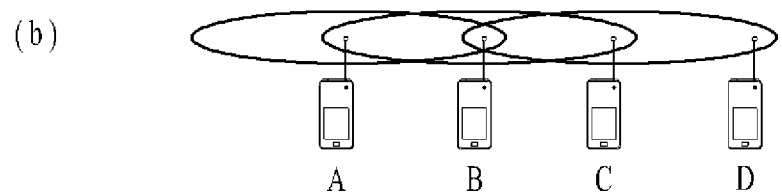

FIG. 19

| Element ID | Length | TSF 0 Offset | Interval/ Duration | Optional Subelements |
|---|---|---|---|---|

Octets : 1 | 1 | 8 | 4 | variable

FIG. 20

| Element ID | Length | DTIM Count | DTIM Period | Bitmap Control | Partial Virtual Bitmap |
|---|---|---|---|---|---|

Octets :    1    1    1    1    1    1-251

FIG. 21

\* TIM with original AIDs

| AID | 1 | 2 | 3 | 4 | 5 | 6 | 7 | 8 | 9 | 10 | 11 | 12 |
|---|---|---|---|---|---|---|---|---|---|---|---|---|
| TIM | 0 | 1 | 0 | 0 | 0 | 1 | 0 | 0 | 0 | 1 | 0 | 0 |

\* TIM with re-assigned AIDs
- AID 6 → AID 1
- AID 10 → AID 3

| AID | 1 | 2 | 3 | 4 | 5 | 6 | 7 | 8 | 9 | 10 | 11 | 12 |
|---|---|---|---|---|---|---|---|---|---|---|---|---|
| TIM | 1 | 1 | 1 | 0 | 0 | 0 | 0 | 0 | 0 | 0 | 0 | 0 |

| 1 | 0 | 0 | 0 | 0 | 0 | 0 | 0 |
|---|---|---|---|---|---|---|---|
| AID n | AID n+1 | AID n+2 | AID n+3 | AID n+4 | AID n+5 | AID n+6 | AID n+7 |

| 1 | 0 | 0 | 0 | 0 | 0 | 0 | 0 |
|---|---|---|---|---|---|---|---|
| AID n+8 | AID n+9 | AID n+10 | AID n+11 | AID n+12 | AID n+13 | AID n+14 | AID n−15 |

< Sequential bitmap >

(b)

| 1 | 1 | 0 | 0 | 0 | 0 | 0 | 0 |
|---|---|---|---|---|---|---|---|
| AID n | AID n+8 | AID n+16 | AID n+24 | AID n+32 | AID n+40 | AID n+48 | AID n−56 |

| 0 | 0 | 0 | 0 | 0 | 0 | 0 | 0 |
|---|---|---|---|---|---|---|---|
| AID n+1 | AID n+9 | AID n+17 | AID n+25 | AID n+33 | AID n+41 | AID n+49 | AID n−57 |

< Linear bitmap >

FIG.30

Traffic Indication Bitmap

| | Subblock1 | | | | | | | Subblock8 |
|---|---|---|---|---|---|---|---|---|
| Block#0 | 00000000 | 00100110 | 00000000 | 00000000 | 00000000 | 00000000 | 00000000 | 00000000 |
| Block#1 | 00000000 | 00000000 | 00000000 | 00000000 | 10100110 | 00000000 | 00000000 | 00000000 |
| Block#2 | 00000000 | 00000000 | 00000000 | 00000000 | 00000000 | 10100111 | 00000000 | 00000000 |

Block Ctrl (3b) | Block offset | Block bitmap (3 bytes)
Long block bitmap | 00000 | 010000000000010000000010
                         {#0}      {#1}        {#2}

→ 00100110 | 10100110 | 10100111
Sub-block bitmap 2 | Sub-block bitmap 5 | Sub-block bitmap 7

Total 7 bytes

METHOD FOR TRANSMITTING AND RECEIVING TRAFFIC INDICATION MAP IN WIRELESS COMMUNICATION SYSTEM AND DEVICE THEREFOR

This application is a National Stage Entry of International Application No. PCT/KR2013/002778 filed Apr. 3, 2013, which claims priority to U.S. Provisional Application No. 61/619,425 filed Apr. 3, 2012, both of which are incorporated herein by reference.

TECHNICAL FIELD

The present invention relates to a wireless communication system, and more particularly, to a method of transmitting and receiving a traffic indication map (TIM) in a wireless LAN system and an apparatus therefor.

BACKGROUND ART

Recently, with the help of development of technologies of information and communication, various wireless communication technologies are developing. Among the various wireless communication technologies, a wireless LAN (WLAN) is a technology enabling such a portable terminal as a personal digital assistant (PDA), a laptop computer, a portable multimedia player (PMP) and the like to access the internet in wireless in home, enterprise or an area to which a specific service is provided based on a wireless frequency technology.

In order to overcome a limit for transmission speed, which has been pointed out as a weak point of the wireless LAN, a latest technological standard introduced a system of which network speed and reliability are increased and a management distance of a wireless network is enlarged. For instance, IEEE 802.11n supports high throughput where data processing speed is greater than maximum 540 Mbps. Moreover, in order to minimize a transmission error and optimize data speed, a MIMO (multiple inputs and multiple outputs) technology using multiple antennas in both a transmitting end and a receiving end is introduced.

DISCLOSURE OF THE INVENTION

Technical Tasks

One object of the present invention is to propose a method of transmitting and receiving an enhanced TIM structure in a wireless communication system, preferably, in a wireless LAN system and an apparatus therefor.

Another object of the present invention is to propose a TIM structure capable of indicating an STA (station) in which buffered downlink data exist in accordance with a plurality of blocks.

The other object of the present invention is to propose a structure for reducing overhead of a TIM bitmap.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of transmitting a traffic indication map (TIM) to a station (STA) in a wireless communication system includes the step of transmitting the TIM to the STA via a beacon frame, wherein the TIM includes a block bitmap field, which indicates a sub-block including an STA in which downlink data buffered for each of N (N is a natural number equal to or greater than 2) number of blocks exist, and a block control field indicating an encoding scheme of the bitmap field.

To further achieve these and other advantages and in accordance with the purpose of the present invention, according to a different embodiment, a method of receiving a traffic indication map (TIM), which is received by a station (STA) in a wireless communication system, includes the step of receiving the TIM from an access point (AP) via a beacon frame, wherein the TIM includes a block bitmap field, which indicates a sub-block including an STA in which downlink data buffered for each of N (N is a natural number equal to or greater than 2) number of blocks exist, and a block control field indicating an encoding scheme of the bitmap field.

Following items can be commonly applied to embodiments according to the present invention.

The block bitmap field can have a size of N byte.

The block bitmap field of 1 byte unit can indicate blocks different from each other.

The N may correspond to a fixed value in the wireless communication system or a value configured by an access point (AP).

The TIM can further include a block bitmap size field indicating a size of the block bitmap field.

The block bitmap size field can indicate the size of the block bitmap field by N byte.

The block bitmap field and a sub-block bitmap field indicated by the block bitmap field can be repeatedly appeared by N times in the TIM.

It is to be understood that both the foregoing general description and the following detailed description are exemplary and explanatory and are intended to provide further explanation of the invention as claimed.

Advantageous Effects

According to embodiment of the present invention, a method of transmitting and receiving an enhanced TIM structure in a wireless communication system, preferably, in a wireless LAN system and an apparatus therefor can be provided.

And, according to embodiment of the present invention, a TIM structure capable of indicating an STA (station) in which buffered downlink data exist can be provided in accordance with a plurality of blocks.

And, according to embodiment of the present invention, a structure capable of reducing overhead of a TIM bitmap is provided.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 13 is a diagram for explaining a hidden node and an exposed node;

FIG. 19 is a diagram for an example of a U-APSD coexistence element format;

FIG. 20 is a diagram for an example of a TIM element format;

FIG. 21 is a diagram for an example of compression of a TIM element using dynamic AID assignment;

FIG. 23 is a diagram for explaining a bitmap format of a TIM element according to one embodiment of the present invention;

FIGS. 29 to 31 are diagrams for explaining examples of a long block bitmap encoding scheme;

BEST MODE

Mode for Invention

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details.

Occasionally, to prevent the present invention from getting vaguer, structures and/or devices known to the public are skipped or can be represented as block diagrams centering on the core functions of the structures and/or devices.

Specific terminologies used in the following description are provided to help understand the present invention and the use of the specific terminologies can be modified into a different form in a range of not deviating from the technical idea of the present invention.

Embodiments of the present invention may be supported by the standard documents disclosed in at least one of wireless access systems including IEEE 802 system, 3GPP system, 3GPP LTE system, 3GPP LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description of embodiments of the present invention may be usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3$^{rd}$ Generation Partnership Project) LTE (long term evolution) is a part of E-UMTS (Evolved UMTS) that uses E-UTRA. The 3GPP LTE adopts OFDMA in downlink (hereinafter abbreviated DL) and SC-FDMA in uplink (hereinafter abbreviated UL). And, LTE-A (LTE-Advanced) is an evolved version of 3GPP LTE.

For clarity, the present invention mainly concerns IEEE 802.11 system, by which the technical characteristic of the present invention may be non-limited.

The General of System

Figure 1:
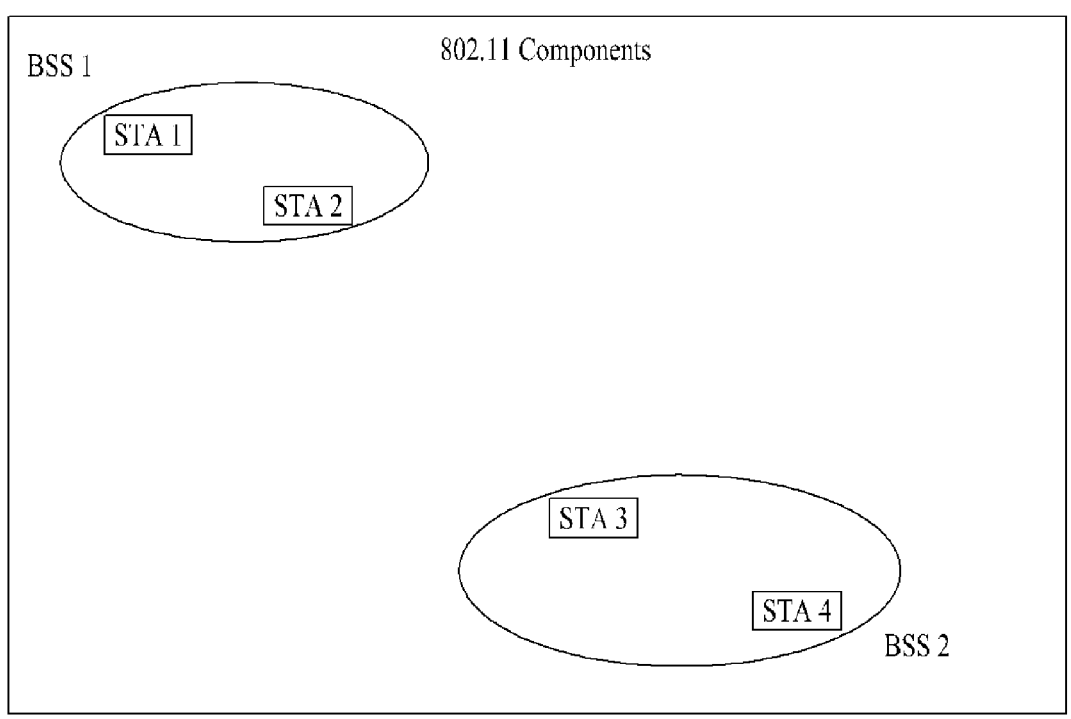
FIG. 1 is a diagram for an example of a structure of IEEE 802.11 system to which the present invention is applicable.

FIG. 1 is a diagram for an example of a structure of IEEE 802.11 system to which the present invention is applicable.

IEEE 802.11 structure can consist of a plurality of configuration elements and a WLAN supporting mobility of an STA, which is transparent to an upper layer, can be provided by interaction of a plurality of the configuration elements. A basic service set (hereinafter abbreviated BSS) may correspond to a basic configuration block in IEEE 802.11 LAN. FIG. 1 depicts an example that there exist two BSSs (BSS 1 and BSS 2) and two STAs are included in each of the BSSs as members, respectively (STA 1 and STA 2 are included in the BSS 1 and STA 3 and STA 4 are included in the BSS 2).

An oval indicating a BSS in FIG. 1 may be comprehended as a coverage area of the STAs included in the BSS to maintain a communication. This area can be called a basic service area (hereinafter abbreviated BSA). If an STA moves out of the BSA, the STA cannot directly communicate with different STAs within the BSA.

A BSS of a most basic type in IEEE 802.11 LAN may correspond to an independent BSS (hereinafter abbreviated IBSS). For instance, the IBSS may have a minimum form consisting of two STAs only. The BSS (BSS 1 or BSS 2), which is the simplest form and omitted different configuration elements, in FIG. 1 may correspond to a representative example of the IBSS. This sort of configuration is available when the STAs are able to directly communicate with each other. And, this kind of LAN can be configured when a LAN is necessary instead of being configured in advance. Hence, this network may be called an ad-hoc network.

When power of an STA is turned on or turned off or an STA enters into a BSS area or gets out of the BSS area, a membership of the STA in a BSS can be dynamically changed. In order to be a member of the BSS, the STA can join the BSS using a synchronization process. In order to access all services based on a BSS structure, the STA should be associated with the BSS. The association can be dynamically set and may include a use of a distribution system service (hereinafter abbreviated DSS).

Figure 2:
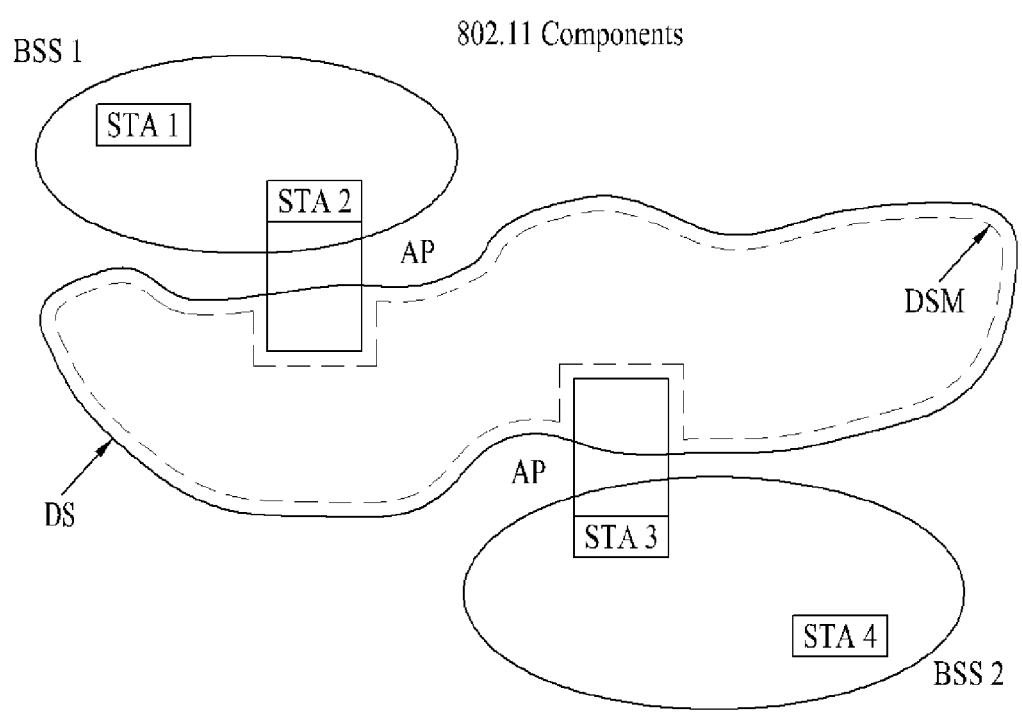
FIG. 2 is a diagram for a different example of a structure of IEEE 802.11 system to which the present invention is applicable.

FIG. 2 is a diagram for a different example of a structure of IEEE 802.11 system to which the present invention is applicable. FIG. 2 is a form to which such a configuration element as a distribution system (DS), a distribution system medium (DMS), an access point (AP), and the like is added to the structure of FIG. 1.

In a LAN, a direct distance between stations can be restricted by PHY performance. In some cases, the distance may be sufficient to perform a communication. Yet, in some cases, it may be necessary to perform a communication of a longer distance between stations. The distribution system (DS) can be configured to support an extended coverage.

The DS means a structure that BSSs are connected with each other. Specifically, instead of independently existing as depicted in FIG. 1, a BSS may exist as a configuration element of an extended form of a network consisting of a plurality of BSSs.

The DS is a logical concept and can be characterized by an attribute of the distribution system medium (DSM). Regarding this, IEEE 802.11 standard logically distinguishes a wireless medium (WM) from the distribution system medium (DSM). Each of the logical media is used for purposes different from each other and is used by configuration elements different from each other. According to the definition of IEEE 802.11 standard, the media may be limited to neither an identical medium nor media different from each other. Flexibility of the IEEE 802.11 LAN structure can be explained in that pluralities of the media are logically different from each other. In particular, IEEE 802.11 LAN structure can be variously implemented. The corresponding LAN structure can be independently characterized by a physical attribute of each implementation example.

The DS can support a mobile device in a manner of providing the mobile device with a seamless integration of a plurality of BSSs and logical services necessary for controlling an address to a destination.

The AP enables related STAs to access the DS via the WM and means an entity having STA functionality. Data can move between the BSS and the DS via the AP. For instance, an STA 2 and an STA 3 depicted in FIG. 2 have STA functionality and provide a function of enabling the related STAs (an STA 1 and an STA 4) to access the DS. And, since all APs basically correspond to an STA, all APs are entities capable of being addressed. An address used by the AP for a communication in the WM may not be identical to an address used by the AP for a communication in the DS.

A data transmitted to an STA address of an AP from one of STAs related to the AP is always received in an uncontrolled port and can be processed by IEEE 802.1X port entity. And, if a controlled port is authenticated, a transmission data (or a frame) can be delivered to the DS.

Figure 3:
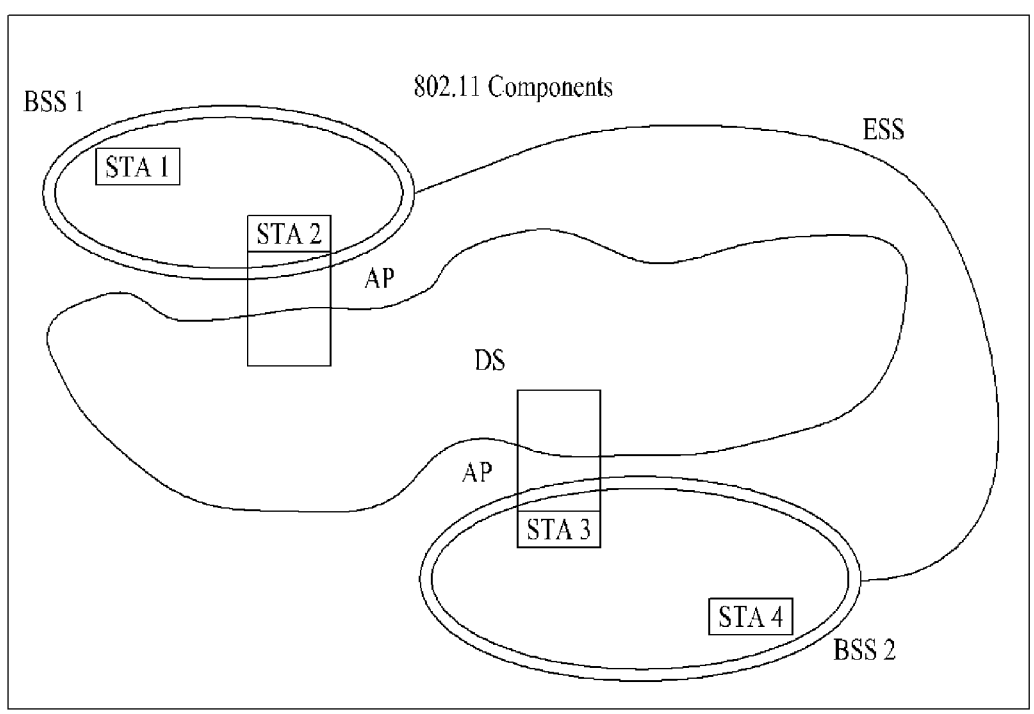
FIG. 3 is a diagram for a further different example of a structure of IEEE 802.11 system to which the present invention is applicable.

FIG. 3 is a diagram for a further different example of a structure of IEEE 802.11 system to which the present invention is applicable. FIG. 3 conceptually shows an extended service set (hereinafter abbreviated ESS) configured to provide a wider coverage in addition to the structure of FIG. 2.

A wireless network of an arbitrary size and complexity may consist of a DS and BSSs. This kind of network is called an ESS network in IEEE 802.11 system. The ESS may correspond to a set of BSSs connected with a single DS. Yet, the ESS does not include the DS. The ESS network is seen as an IBSS network in a LLC (logical link control) layer. STAs included in the ESS can communicate with each other and moving STAs can move from one BSS to another BSS (within an identical ESS) in a manner of being transparent to the LLC.

According to IEEE 802.11, nothing is assumed for a physical location of the BSSs depicted in FIG. 3. Forms described in the following are all available in IEEE 802.11. The BSSs can be partly overlapped with each other. This is a form generally used to provide a contiguous coverage. And, the BSSs may not be physically connected with each other and there is no limit for a logical distance between the BSSs. The BSSs can be physically positioned at an identical location. This can be used to provide a redundancy. And, one (or more) IBSS or ESS networks can physically exist in an identical space as one (or more) ESS network. This may correspond to a form of the ESS network in case that an ad-hoc network operates in the location at which the ESS network exists, physically duplicated IEEE 802.11 networks are configured by different organizations, two or more different access and security policies are required in an identical location, and the like.

Figure 4:
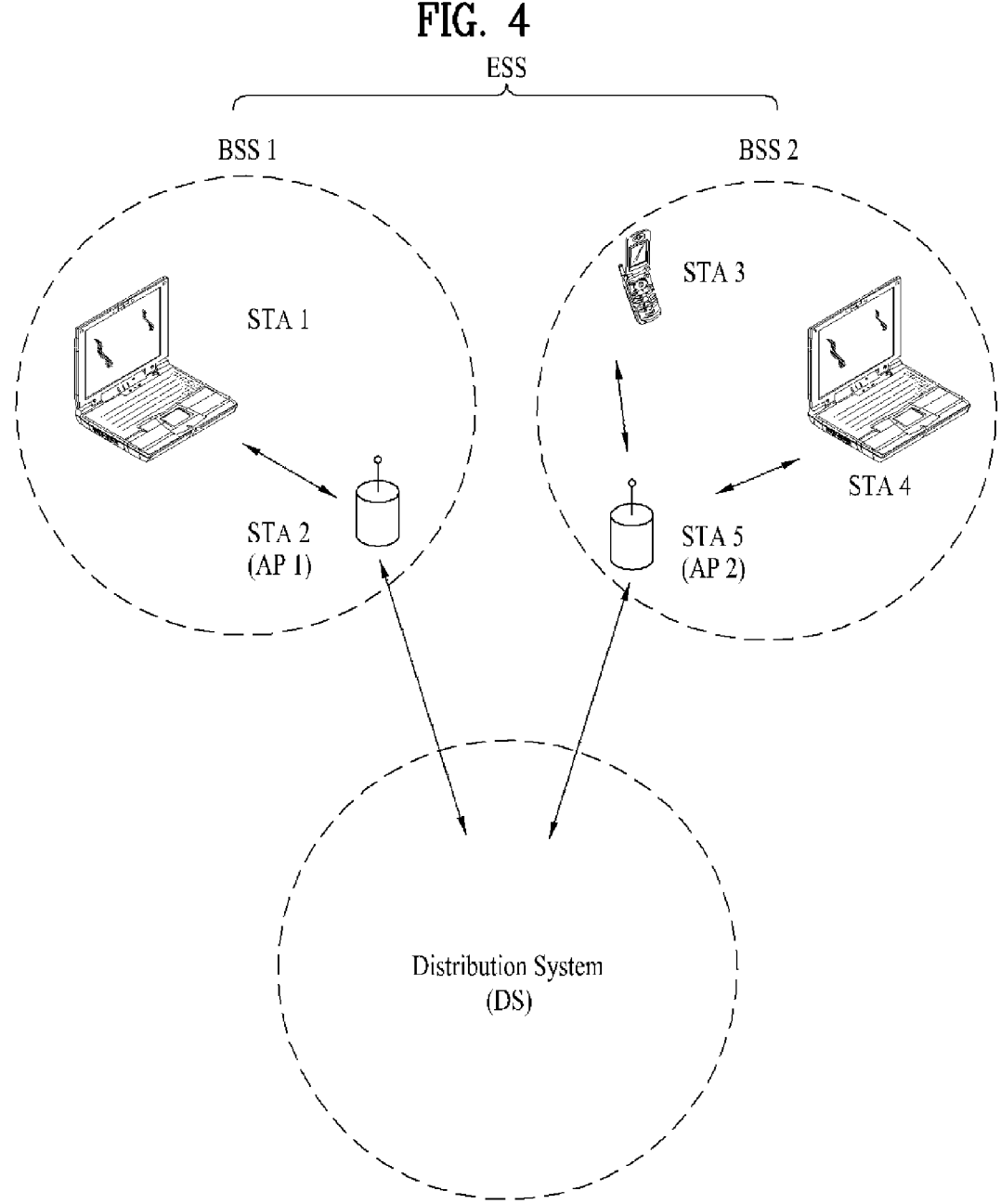
FIG. 4 is a diagram for an example of a structure of WLAN system.

FIG. 4 is a diagram for an example of a structure of WLAN system. FIG. 4 shows an example of an infrastructure BSS including a DS.

According to the example of FIG. 4, an ESS consists of a BSS 1 and a BSS 2. In a WLAN system, an STA corresponds to a device operating in accordance with a MAC/PHY regulation of IEEE 802.11. The STA includes an AP STA and a non-AP STA. The non-AP STA corresponds to a device directly controlled by a user such as a laptop computer and a cellular phone. In the example of FIG. 4, an STA 1, an STA 3, and an STA 4 correspond to the non-AP STA and an STA 2 and an STA 5 correspond to the AP STA.

In the following description, the non-AP STA may be called a terminal, a wireless transmit/receive unit (WTRU), a user equipment (UE), a mobile station (MS), a mobile terminal (MT), a mobile subscriber station (MSS), and the like. And, the AP is a concept corresponding to a base station (BS), a node B, an evolved Node B (eNB), a base transceiver system (BTS), a femto base station (femto BS), and the like in a different wireless communication field.

Figure 5:
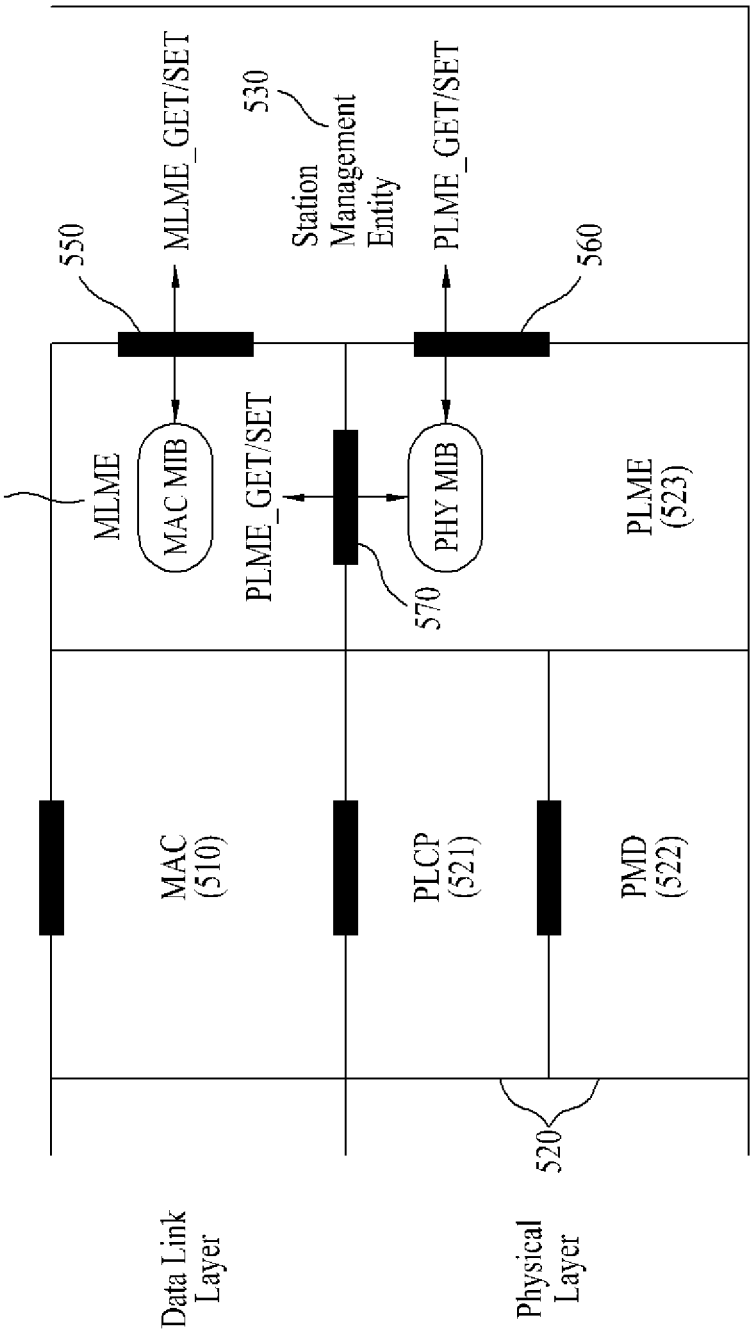
FIG. 5 is a diagram for an example of a data link layer structure and a physical layer structure of IEEE 802.11 system to which the present invention is applicable.

FIG. 5 is a diagram for an example of a data link layer structure and a physical layer structure of IEEE 802.11 system to which the present invention is applicable.

Referring to FIG. 5, a physical layer 520 can include a PLCP (physical layer convergence procedure) entity 521 and a PMD (physical medium dependent) entity 522. The PLCP entity 21 plays a role of connecting a MAC sub-layer 510 with a data frame. The PMD entity 522 plays a role of transceiving data with two or more STAs in wireless using an OFDM scheme.

Both the MAC sub-layer 510 and the physical layer 520 can include a conceptual management entity. The conceptual management entity of the MAC sub-layer and the conceptual management entity of the physical layer are called a MLME (MAC sub-layer management entity) 511 and a PLME (physical layer management entity) 523, respectively. These entities 51/521 provide a layer management service interface via an operation of a layer management function.

In order to provide a precise MAC operation, there may exist an SME (station management entity) 530 in each STA. The SME 530 is a management entity independent of each layer. The SME collects layer based state information from a plurality of layer management entities or configures a value of specific parameters of each layer. The SME 530 can perform the aforementioned function instead of general system management entities and can implement a standard management protocol.

The aforementioned various entities can interact with each other using various methods. FIG. 5 shows an example of exchanging a GET/SET primitive with each other. An XX-GET.request primitive is used for requesting a value of an MIB (management information base) attribute. If a state corresponds to 'SUCCESS', an XX-GET.confirm primitive returns the MIB attribute value. Otherwise, the XX-GET-.confirm primitive returns in a manner of displaying an error sign in a state field. An XX-SET.request primitive is used to make a request for setting a designated MIB attribute with a given value. If the MIB attribute means as a specific operation, the request makes a request for an execution of the specific operation. And, if a state corresponds to 'SUCCESS', an XX-SET.confirm primitive means that the designated MIB attribute is set with the requested value. Other cases except the aforementioned cases indicate an error situation. If the MIB attribute means a specific operation, this primitive can confirm that the operation is performed.

As shown in FIG. 5, the MLME 511 and the SME 530 can exchange various primitives with each other via an MLME_SAP (MLME_service access point) 550. And, the PLME 523 and the SME 530 can exchange various primitives with each other via a PLME_SAP (PLME_service access point) 560. And, a primitive can be exchanged with each other between the MLME 511 and the PLME 523 via an MLME-PLME_SAP (MLME-PLMEservice access point) 570.

Link Setup Process

Figure 6:
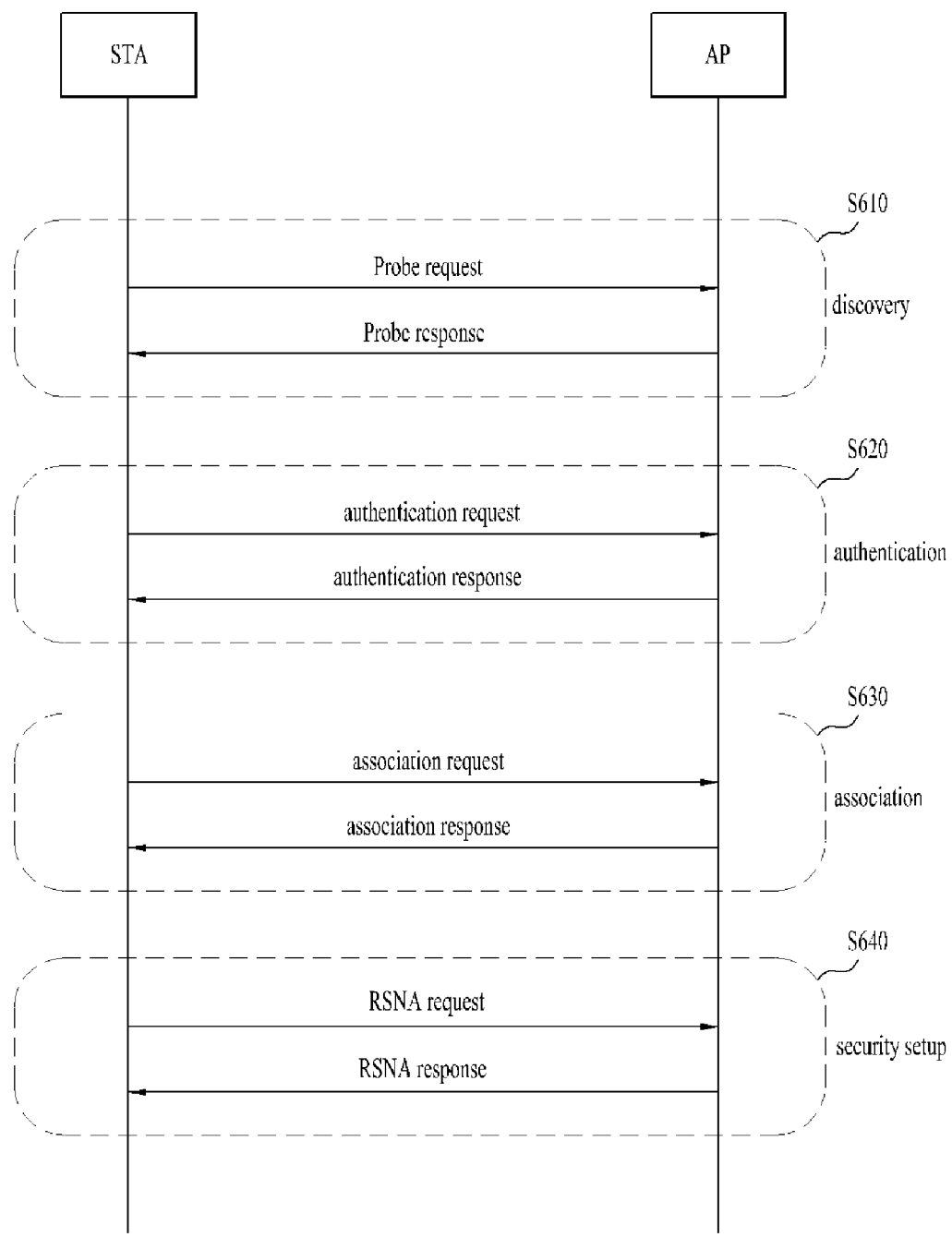
FIG. 6 is a flowchart for explaining a general link setup process in a wireless LAN system to which the present invention is applicable.

FIG. 6 is a flowchart for explaining a general link setup process in a wireless LAN system to which the present invention is applicable.

In order for an STA to setup a link with a network and transceive data with the network, first of all, the STA should discover the network, perform authentication, establish association and undergo an authentication procedure for security. A link setup process may also be called a session initiation process or a session setup process. And, the processes of the link setup process including the discovery, the authentication, the association and the security configuration can be commonly called the association process.

An example of the link setup process is explained in the following with reference to FIG. 6.

In the step S610, an STA can perform a network discovery operation. The network discovery operation can include a scanning operation of the STA. In particular, in order for the STA to access a network, the STA should find out a network in which the STA is able to participate. Before the STA participates in a wireless network, the STA should identify a compatible network. A process of identifying a network existing at a specific area is called a scanning.

A scanning scheme can be classified into an active scanning and a passive scanning.

For instance, FIG. 6 shows a network discovery operation including an active scanning process. In case of performing an active scanning, in order for an STA performing the scanning to search for APs existing in the vicinity of the STA, the STA transmits a probe request frame while moving around channels and waits for a response in response to the probe request frame. A responder transmits a probe response frame to the STA, which have transmitted the probe request frame, in response to the probe request frame. In this case, the responder may correspond to an STA, which have lastly transmitted a beacon frame in a BSS of a channel currently being scanned. Since an AP transmits a beacon frame in the BSS, the AP becomes a responder. On the contrary, in an IBSS, since STAs in the IBSS transmit a beacon frame in turn, a responder varies. For instance, if an STA transmits a probe request frame on a #1 channel and receives a probe response frame on the #1 channel, the STA stores BSS-related information included in the received probe response frame, moves to a next channel (e.g., a #2 channel) and may be then able to perform a scanning (i.e., transmitting/receiving a probe request/response) using an identical method.

Although it is not depicted in FIG. 6, a scanning operation can be performed by a passive scanning scheme. An STA performing a scanning in the passive scanning waits for a beacon frame while moving around channels. The beacon frame is one of management frames in IEEE 802.11. The beacon frame is periodically transmitted to notify existence of a wireless network, make the STA performing the scanning find out the wireless network and participate in the wireless network. An AP plays a role of periodically transmitting the beacon frame in the BSS and STAs in the IBSS transmit the beacon frame in turn in the IBSS. If the STA performing the scanning receives the beacon frame, the STA stores information on the BSS included in the beacon frame and records beacon frame information in each channel while moving to a different channel. Having received the beacon frame, the STA stores BSS-related information included in the received beacon frame, moves to a next channel and can perform scanning using an identical method in the next channel.

When comparing the active scanning with the passive scanning, the active scanning is superior to the passive scanning in terms of a low delay and a less power consumption.

In the step S620, an authentication process can be performed after a network is discovered by the STA. In order to clearly distinguish the authentication process from a security setup operation described in the following in the step S640, the authentication process can be called a first authentication process.

The authentication process includes a process that the STA transmits an authentication request frame to the AP and the AP transmits an authentication response frame to the STA in response to the authentication request frame. An authentication frame used for the authentication request/response corresponds to a management frame.

The authentication frame can include information on an authentication algorithm number, an authentication transaction sequence number, a status code, a challenge text, an RSN (robust security network), a finite cyclic group and the like. The above-mentioned corresponds to a part of examples of information capable of being included in the authentication request/response frame only. The above-mentioned information can be replaced with different information or additional information can be further included as well.

The STA can transmit the authentication request frame to the AP. The AP can determine whether to permit authentication for the STA based on information included in the received authentication request frame. The AP can provide a result of authentication process to the STA via the authentication response frame.

After the STA is successfully authenticated, an association process can be performed in the step S630. The association process can include a process that the STA transmits an association request frame to the AP and the AP transmits an association response frame to the STA in response to the association request frame.

For instance, the association request frame can include information on various capabilities, information on beacon listening interval, an SSID (service set identifier), supported rates, supported channels, an RSN, a mobility domain, supported operating classes, a TIM (traffic indication map) broadcast request, an interworking service capability and the like.

For instance, the association response frame can include information on various capabilities, information on a status code, an AID (association ID), supported rates, an EDC (enhanced distributed channel access) parameter set, an RCPI (received channel power indicator), an RSNI (received signal to noise indicator), a mobility domain, a timeout interval (association comeback time), an overlapping BSS scan parameter, a TIM broadcast response, a QoS (quality of service) map and the like.

The above-mentioned corresponds to a part of examples of information capable of being included in the association request/response frame only. The above-mentioned information can be replaced with different information or additional information can be further included as well.

After the STA is successfully associated with the network, a security setup process can be performed in the step S640. The security setup process in the step S640 may be called an authentication process via an RSNA (robust security network association) request/response. Or, the authentication process in the step S620 is called a first authentication process and the security setup process in the step S640 can be simply called an authentication process.

For instance, the security setup process in the step S640 may include a process of performing a private key setup via four-way handshaking via an EAPOL (extensible authentication protocol over LAN) frame. And, the security setup process may be performed according to a security scheme not defined by IEEE 802.11 standard.

Evolution of WLAN

As a lately established technological standard to overcome a limit for transmission speed in a wireless LAN, there exist IEEE 802.11n. An object of IEEE 802.11n is to increase speed and reliability of a network and enlarge management distance of the wireless network. More specifically, IEEE 802.11n supports HT (high throughput) where data processing speed is greater than maximum 540 Mbps. And, IEEE 802.11n is based on MIMO (multiple inputs and multiple outputs) corresponding to a technology using multiple antennas in both a transmitting end and a receiving end to minimize a transmission error and optimize data speed.

As dissemination of a wireless LAN is vitalized and an application using the wireless LAN is diversified, a necessity for a new wireless LAN is coming to the fore to support a throughput higher than the data processing speed supported by IEEE 80.11n. A next generation wireless LAN system (e.g., IEEE 802.11ac) supporting a VHT (very high throughput) corresponds to a next version of the IEEE 802.11n wireless LAN system. The system is one of IEEE 802.11 wireless LAN systems newly proposed to support data processing speed faster than 1 Gbps in a MAC service access point (SAP).

In order to efficiently use a wireless channel, the next generation wireless LAN system supports transmission of an MU-MIMO (multi user multiple input multiple output) scheme of which a plurality of STAs access a channel at the same time. According to the MU-MIMO transmission scheme, an AP can transmit a packet to one or more MIMO-paired STAs at the same time. And, supporting a wireless LAN operation in a whitespace is under discussion. For instance, introduction of wireless LAN in such a TV whitespace (TV WS) as a frequency band (e.g., 54~698 MHz) of idle state, which is caused by digitalization of an analog TV, is discussed as IEEE 802.11af standard. Yet, this is just an example. The white space may correspond to a licensed band capable of being preferentially used by a licensed user. The licensed user indicates a user corresponding to a person that the use of the licensed band is granted. The licensed user can be called a licensed device, a primary user, am incumbent user or the like.

For instance, an AP and/or an STA operating in the WS should provide a protection function to the licensed user. For instance, if such a licensed user as a microphone already uses a specific WS channel, which is a divided frequency band according to a regulation to have a specific bandwidth in the WS band, the AP and/or the STA cannot use a frequency band corresponding to the WS channel to protect the licensed user. And, if the licensed user uses a frequency band, which is currently used for transmitting and/or receiving a frame, the AP and/or the STA should stop using the frequency band.

Hence, the AP and/or the STA should preferentially perform a procedure for figuring out whether a specific frequency band is usable in the WS band, in other word, whether there is a licensed user in the frequency band. The procedure figuring out whether there is the licensed user in the specific frequency band is called spectrum sensing. As a spectrum sensing mechanism, an energy detection scheme, a signature detection scheme and the like can be utilized. If strength of a reception signal is greater than a prescribed value, it can be determined as the licensed user is using the signal. Or, if a DTV preamble is detected, it can be determined as the licensed user is using the signal.

And, as a next generation communication technology, an M2M (machine-to-machine) communication technology is under discussion. A technology standard to support M2M communication is developing as IEEE 802.11ah in the IEEE 802.11 wireless LAN system. The M2M communication indicates a communication scheme including one or more machines and can also be called an MTC (machine type communication) or an object communication. In this case, the machine indicates an entity not requiring a direct control or involvement of a human. For instance, examples of the machine may include such a personal device as a smartphone as well as such a device as a meter equipped with a wireless communication module or an auto-vending machine. The M2M communication can include a communication between devices (e.g., D2D (device-to-device communication)), a communication between a device and a server (application server) and the like. As an example of the communication between the device and the server, there are a communication between an auto-vending machine and a server, a communication between a POS (point of sale) device and a server, a communication between an electricity, gas or water supply meter and a server. Besides, an M2M communication based application may include security, transportation, healthcare and the like. According to a characteristic of the aforementioned applied example, it is necessary for the M2M communication to slowly transmit and receive a less amount of data from time to time in environment in which very large number of devices are existing.

Specifically, the M2M communication should be able to support many number of STAs. According to a currently defined wireless LAN system, it is assumed a case that maximum 2007 STAs are connected to a single AP. Yet, the M2M communication is discussing methods of supporting a case that more STAs (about 6000 STAs) are connected to a single STA. And, it is anticipated that there will be an application supporting/requiring a low transmission speed in the M2M communication. In order to smoothly support the application, for instance, an STA can recognize whether there exist data to be transmitted to the STA based on a TIM (traffic indication map) element in a wireless LAN system. Currently, methods of reducing a bitmap size of the TIM is under discussion. And, it is anticipated that there will be great amount of traffic where a transmission/reception interval is very long in the M2M communication. For instance, it is required to transmit and receive a very small amount of data in every long period (e.g., in every one month) such as the amount of using electricity/gas/water supply. Hence, although the number of STAs capable of being connected to a single AP considerably increases, methods of efficiently supporting a case that there are very few number of STA receiving data frame from the AP within a beacon interval are under discussion in the wireless LAN system.

As mentioned in the foregoing description, a wireless LAN technology is rapidly evolving. Besides the aforementioned examples, a technology for a direct link setup, enhancement of a media streaming capability, supporting an initial session setup of a high speed and/or a large scale, supporting an enlarged bandwidth and operating frequency and the like is developing.

Frame Structure

Figure 7:
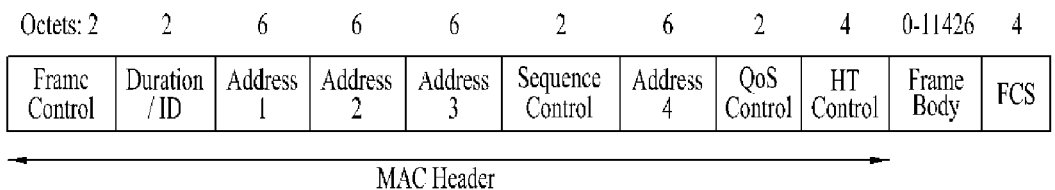
FIG. 7 is a diagram for an example of a MAC frame format of IEEE 802.11 system to which the present invention is applicable.

FIG. 7 is a diagram for an example of a MAC frame format of IEEE 802.11 system to which the present invention is applicable.

Referring to FIG. 7, a MAC frame format includes a MAC header (MHR), a MAC payload and a MAC footer (MFR). The MHR is defined by a region including a frame control field, a duration/ID field, an address 1 field, an address 2 field, an address 3 field, a sequence control field, an address 4 field, a QoS control field and a HT control field. A frame body field is defined by the MAC payload. Data intended to be transmitted by upper layer is positioned at the frame body field. The frame body field has a variable size. A frame check sequence (FCS) field is defined by the MAC footer and is used to detect an error of the MAC frame.

A minimum frame format is configured by the first three fields (the frame control field, the duration/ID field and the address 1 field) and a very last field (the FCS field). The first three fields and the last field exist in all frames. The remaining fields can exist in a specific frame type only.

Information included in each of the aforementioned fields may follow the definition of IEEE 802.11 system. And, the each of the aforementioned fields corresponds to an example of fields capable of being included in a MAC frame. Each field can be replaced with a different field or an additional field can be further included as well.

Figure 8:
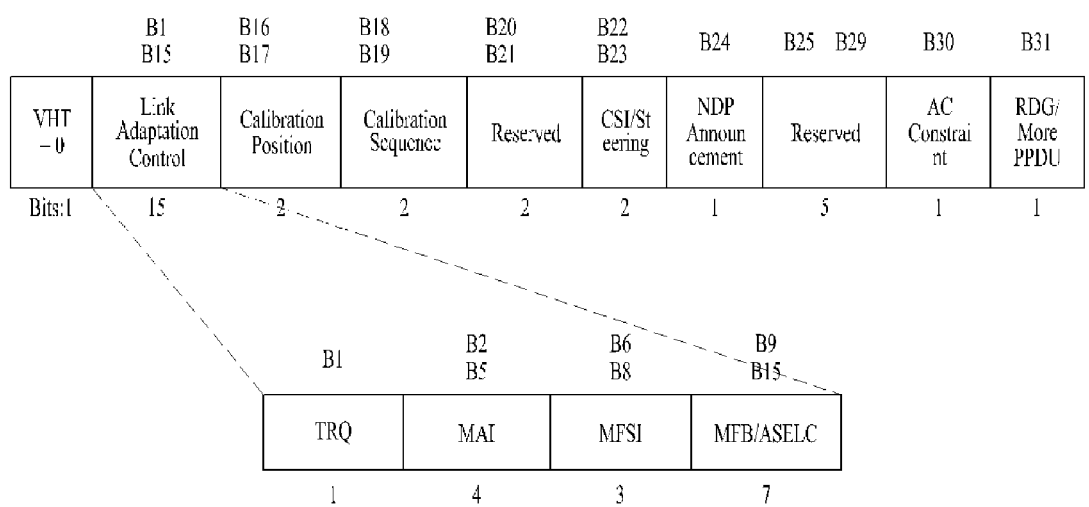
FIG. 8 is a diagram for an example of an HT format of an HT control field in a MAC frame according to FIG. 7.

FIG. 8 is a diagram for an example of an HT format of an HT control field in a MAC frame according to FIG. 7.

Referring to FIG. 8, the HT control field can include a VHT subfield, a link adaptation subfield, a calibration position subfield, a calibration sequence subfield, a channel state information (CSI)/steering subfield, an NDP (null data packet) announcement subfield, an AC (access category) constraint subfield, an RDG (reverse direction grant/more) PPDU subfield and a reserved subfield.

The link adaptation subfield can include a training request (TRQ) subfield, an MAI (MCS (modulation and coding scheme) request or an ASEL (antenna selection) indication) subfield, an MCS feedback sequence indication (MFSI) subfield, an MCS feedback and antenna selection command/data (MFB/ASELC) subfield.

If a sounding PPDU is requested to a responder, the TRQ subfield is set to 1. If the sounding PPDU is not requested to the responder, the TRQ subfield is set to 0. And, if the MAI subfield is set to 14, it indicates an antenna selection indication (ASEL indication) and the MFB/ASELC subfield is interpreted by the antenna selection command/data. Otherwise, the MAI subfield indicates an MCS request and the MFB/ASELC subfield is interpreted by an MCS feedback. When the MAI subfield indicates an MCS request (MRO), if MCS feedback is not requested, the MAI subfield is set to 0. If the MCS is requested, the MAI subfield is set to 1. The sounding PPDU indicates a PPDU delivering a training symbol usable for a channel estimation.

The aforementioned each of the subfields corresponds to an example of subfields capable of being included in the HT control field. Each field can be replaced with a different subfield. Or, an additional subfield can be further included.

Figure 9:
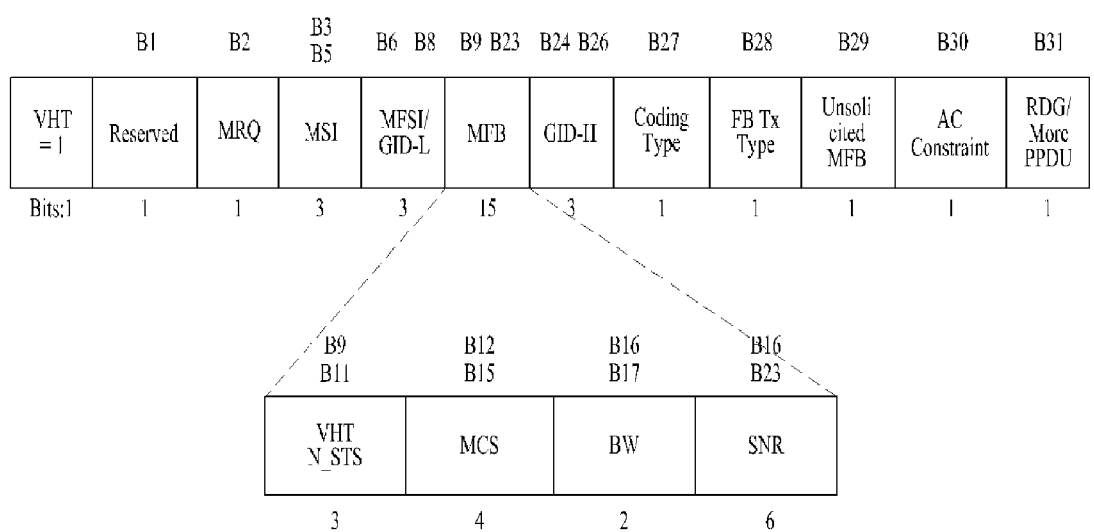
FIG. 9 is a diagram for an example of a VHT format of an HT control field in a MAC frame according to FIG. 7.

FIG. 9 is a diagram for an example of a VHT format of an HT control field in a MAC frame according to FIG. 7.

Referring to FIG. 9, the HT control field can include a VHT subfield, an MRO subfield, an MSI subfield, an MCS feedback sequence indication/group ID lowest bit (MFSI/GID-L: LSB of group ID) subfield, an MFB subfield, a group ID highest bit (GID-H: MSB of group ID) subfield, a coding type subfield, an MFC response transmission type (FB Tx type: transmission type of MFB response) subfield, an unsolicited MFB subfield, an AC constraint subfield, an RDG/more PPDU subfield. And, the MFB subfield can include a VHT space-time stream number (N_STS: number of space time streams) subfield, an MCS subfield, a bandwidth (BW) subfield and a signal to noise ratio (SNR) subfield.

Table 1 shows explanation on each subfield in a VHT format of the HT control field.

TABLE 1

| Subfield | Meaning | Definition |
| --- | --- | --- |
| MRQ | MCS request | If MCS feedback(solicited MFB) is requested, set to 1. Otherwise, set to 0. |
| MSI | MRO sequence identifier | If MRO subfield is set to 1, MSI subfield includes sequence number within a scope ranging from 0 to 6 identifying a specific request. If MRO subfield is set to 0, MSI subfield is reserved. |

TABLE 1-continued

| Subfield | Meaning | Definition |
| --- | --- | --- |
| MFSI/ GID-L | MFB sequence identifier/ LSB of group ID | If unsolicited MFB subfield is set to 0, MFSI/GID-L subfield includes a reception value of MSI included in a frame indicated by MFB information. If unsolicited MFB subfield is set to 1, MFSI/GID-L subfield includes lowest 3 bits of a group ID of PPDU indicated by solicited MFB. |
| MFB | VHT N_STS, MCS, BW, SNR feedback | MFB subfield includes a recommended MFB. MCS = 15, VHT N_STS = 7 indicate that there is no feedback. |
| GID-H | MSB of group ID | If unsolicited MFB subfield is set to 1, GID-H subfield includes highest 3 bits of a group ID of PPDU indicated by the unsolicited MFB. |
| Coding type | Coding type of MFB response | If unsolicited MFB subfield is set to 1, coding type subfield includes 1 in case of coding information (BCC (binary convolution code)) indicated by the unsolicited MFB, 0 in case of LDPC (low-density parity check). Otherwise, reserved. |
| FB Tx type | Transmission type of MFB response | If unsolicited MFB subfield is set to 1 and FB Tx type subfield is set to 0, the unsolicited MFB indicates either unbeamformed VHT PPDU or transmit diversity using STBC (space-time block coding) VHT PPDU. If unsolicited MFB subfield is set to 1 and FB Tx type subfield is set to 1, the unsolicited MFB indicates beamformed SU-MIMO (single user MIMO) VHT PPDU. Otherwise, reserved. |
| Unsolicited MFB | Unsolicited MCS feedback indicator | If MFB is not a response of MRQ, set to 1. If MFB is a response of MRQ, set to 0. |
| Ac constraint | | If response for reverse direction grant (RDG) includes data frame from a traffic identifier (TID), set to 0. If response for reverse direction grant (RDG) includes a frame received from AC identical to last data frame received from an identical reverse direction (RD) initiator only, set to 1. |
| RDG/more PPDU | | When RDG/more PPDU subfield corresponds to 0, if reverse direction (RD) initiator transmits, it indicates there is no reverse direction grant (RDG). If reverse direction (RD) responder transmits, it indicates PPDU delivering MAC frame is last transmission. When RDG/more PPDU subfield corresponds to 1, if reverse direction (RD) initiator transmits, it indicates there exists reverse direction grant (RDG). If reverse direction (RD) responder transmits, there exist following different PPDU after PPDU delivering MAC frame. |

The aforementioned each of the subfields corresponds to an example of subfields capable of being included in the HT control field. Each field can be replaced with a different subfield. Or, an additional subfield can be further included.

In the meantime, the MAC sub-layer delivers an MAC protocol data unit (MPDU) to a physical layer as a physical service data unit (PSDU). A PCCP entity adds a physical header and a preamble to the received PSDU and generates a PLCP protocol data unit (PPDU).

Figure 10:
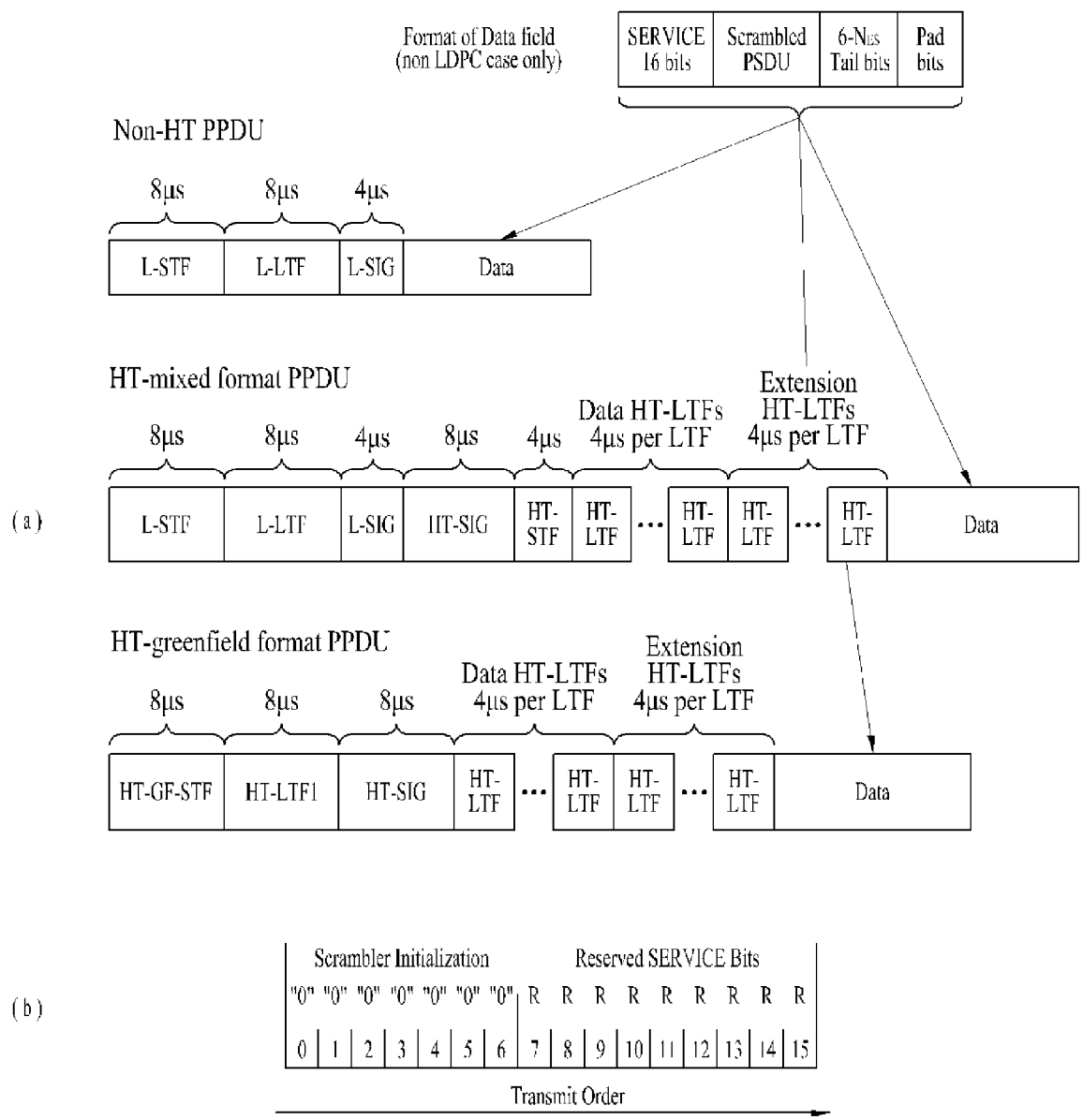
FIG. 10 is a diagram for an example of a PPDU frame format of IEEE 802.11n system to which the present invention is applicable.

FIG. 10 is a diagram for an example of a PPDU frame format of IEEE 802.11n system to which the present invention is applicable.

FIG. 10 (a) shows an example of a PPDU frame according to a non-HT format, an HT mixed format and an HT-greenfield format.

The non-HT format indicates a frame format for a legacy system (IEEE 802.11a/g) STA. A non-HT format PPDU includes a legacy format preamble consisting of a legacy-short training field (L-STF), a legacy-long training field (L-LTF) and a legacy-signal (L-SIG) field.

The HT mixed format permits a communication with a legacy system STA and indicates a frame format for IEEE 802.11n STA at the same time. The HT mixed format PPDU includes a legacy format preamble consisting of the L-STF, the L-LTF and the L-SIG and an HT format preamble consisting of an HT-short training field (HT-STF), an HT-long training field (HT-LTF) and an HT-signal (HT-SIG) field. Since the L-STF, the L-LTF and the L-SIG mean legacy fields for backward compatibility, a part from the L-STF to the L-SIG is identical to the non-HT format. An STA can identify the mixed format PPDU using the HT-SIG field appearing after the part.

The HT-greenfield format is a format not compatible with a legacy system. The HT-greenfield format indicates a format used for an IEEE 802.11n STA. an HT-greenfield format PPDU includes a greenfield preamble consisting of an HT-greenfield-STF (HT-GF-STF), an HT-LTF1, an HT-SIG and one or more HT-LTFs.

A data field includes a service field, PSDU, tail bit and pad bit. All bits of the data field are scrambled.

FIG. 10 (b) shows the service field included in the data field. The service field has 16 bits. Each bit is numbered by 0 to 15. Each bit is sequentially transmitted from a bit #0. The bit #0 to a bit #6 are set to 0 and used to synchronize a descrambler installed in a transmitting end.

Figure 11:
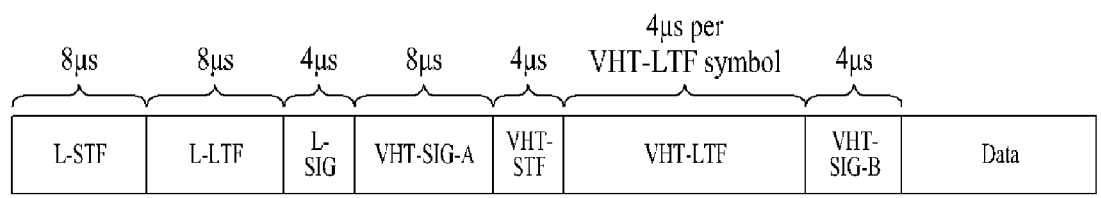
FIG. 11 is a diagram for an example of a VHT PPDU frame format of IEEE 802.11ac system to which the present invention is applicable.

FIG. 11 is a diagram for an example of a VHT PPDU frame format of IEEE 802.11ac system to which the present invention is applicable.

Referring to FIG. 11, a VHT format PPDU includes a legacy format preamble consisting of L-STF, L-LTF and L-SIG and a VHT format preamble consisting of VHT-SIG-A, HT-STF and HT-LTF before a data field. Since the L-STF, the L-LTF and the L-SIG mean a legacy field for backward compatibility, a part from the L-STF to the L-SIG is identical to the non-HT format. An STA can identify the VHT format PPDU using the VHT-SIG field appearing after the part.

The L-STF is a field used for frame detection, auto gain control (AGC) diversity detection, coarse frequency/time synchronization and the like. The L-LTF is a field used for fine frequency/time synchronization, channel estimation and the like. The L-SIG is a field used for transmitting legacy control information. The VHT-SIG-A is a VHT field used for transmitting control information included in VHT STAs in common. The VHT-STF is a field used for AGC for MIMO and a beamformed stream. The VHT-LTFs is a field used for channel estimation for MIMO and a beamformed stream. The VHT-SIG-B is a field used for transmitting specified control information.

Medium Access Mechanism

In a wireless LAN system according to IEEE 802.11, a basic access mechanism of MAC (medium access control) corresponds to a CSMA/CA (carrier sense multiple access with collision avoidance) mechanism. The CSMA/CA mechanism is also called a DCF (distributed coordination function) of IEEE 802.11 MAC. Basically, "listen before talk" access mechanism is adopted. According to this sort of access mechanism, an AP and/or an STA can perform CCA (clear channel assessment) to sense a radio channel or medium during a prescribed time interval (e.g., DIFS (DCF inter-frame space) prior to beginning of transmission. As a result of sensing, if it is determined that the medium is in an idle status, a frame is transmitted using the corresponding medium. On the contrary, if it is detected as the medium is in an occupied status, the AP and/or the STA does not start transmission of its own, waits for accessing the medium in a manner of configuring a delay period (e.g., random backoff period) and may be then able to attempt frame transmission after the delay period. When the random backoff period is applied, since it is expected that many STAs attempt the frame transmission after waiting for time period different from each other, collision can be minimized.

And, IEEE 802.11 MAC protocol provides an HCF (hybrid coordination function). The HCF is performed based on the DCF and a PCF (point coordination function). The PCF is a polling based synchronous access scheme. In order to make all receiving Aps and/or STAs receive a data frame, the data frame is periodically polled. And, the HCF includes an EDCA (enhanced distributed channel access) and an HCCA (HCF controlled channel access). The EDCA is a contention based access scheme used by a provider to provide a data frame to a plurality of users. The HCCA is a non-contention based channel access scheme using a polling mechanism. And, the HCF includes a medium access mechanism used for improving QoS (quality of service) of WLAN and can transmit QoS data in both CP (contention period) and CFP (contention free period).

Figure 12:
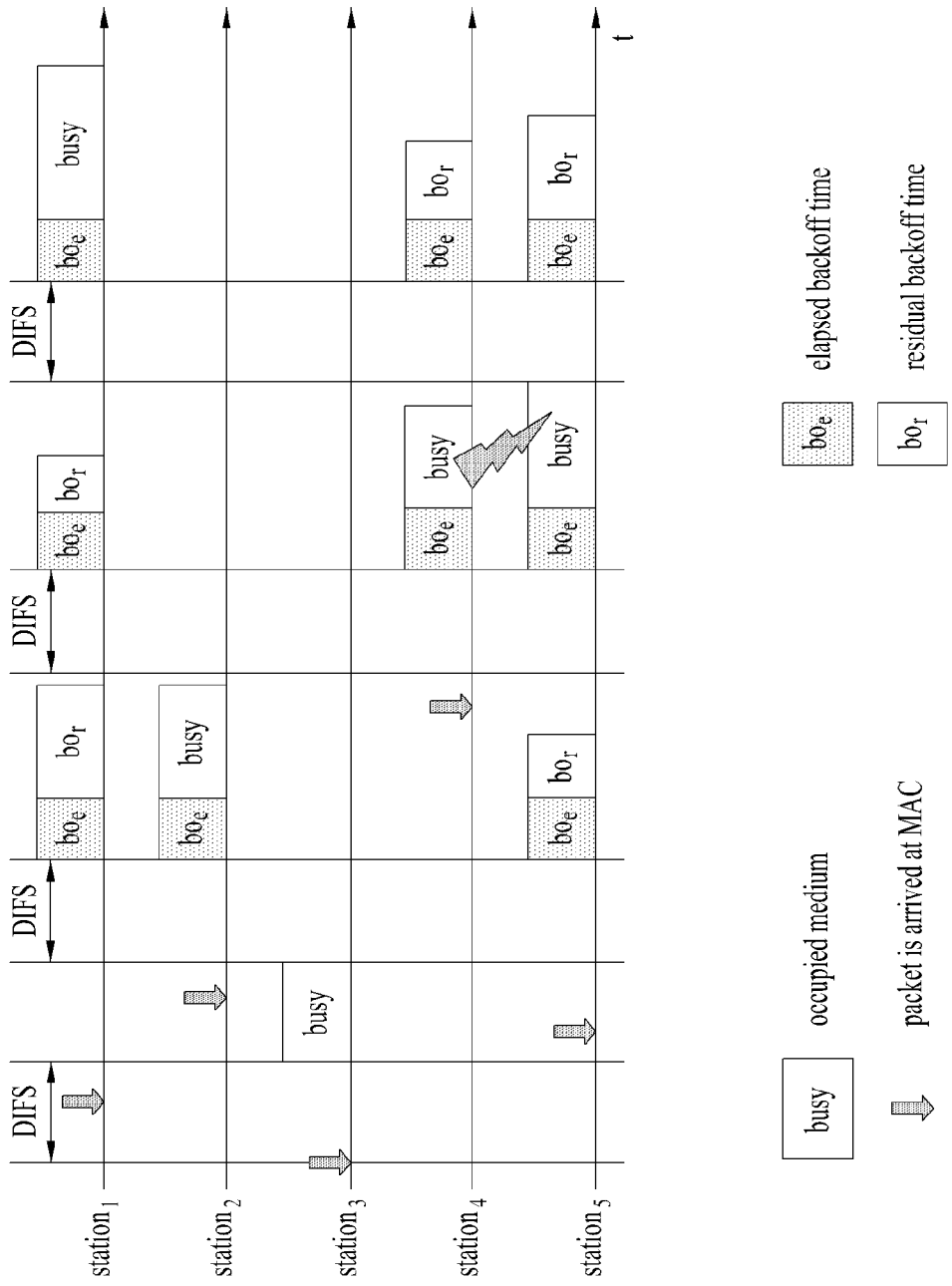
FIG. 12 is a diagram for explaining a backoff process in a wireless LAN system to which the present invention is applicable.

FIG. 12 is a diagram for explaining a backoff process in a wireless LAN system to which the present invention is applicable.

An operation based on a random backoff period is explained with reference to FIG. 12.

If a medium in an occupied or busy status changes its status to an idle status, many STAs can attempt transmission of a data (or a frame). In this case, as a method of minimizing a collision, each of the STAs selects a random backoff count, waits for time as long as slot time corresponding to the random backoff count and may be then able to attempt the transmission. The random backoff count has a pseudo-random integer value and can be determined by one among values ranging from 0 to CW. In this case, the CW is a contention window parameter value. A CWmin is given as an initial value of the CW parameter. If transmission fails (e.g., ACK for a transmitted frame is not received), a doubled value can be given for the CW parameter. If the CW parameter value becomes CWmax, data transmission can be tried out until the data transmission is successful while the CWmax value is maintained. When the data transmission is successful, the CW parameter is reset to the CWmin value. It is preferable to configure the CW, the CEmin and the CWmax with 2n-1 (n=0, 1, 2, ... ).

Once a random backoff process starts, an STA continuously monitors a medium while a backoff slot is count downed according to a determined backoff count value. If the medium is monitored as in an occupied status, countdown is stopped and waits. When the medium is in an idle status, remaining countdown is resumed.

According to an example shown in FIG. 12, when a packet to be transmitted arrives at a MAC of an STA 3, the STA 3 checks that a medium is in an idle status as long as a DIFS and may be then able to directly transmit a frame. Meanwhile, remaining STAs monitor that the medium is in an occupied (busy) status and standby. In this case, data to be transmitted may occur in each of an STA 1, an STA 2 and an STA 5. If it is monitored that the medium is in the idle status, each of the STAs waits for time as long as the DIFS and may be then able to perform countdown of a backoff slot according to a random backoff count value selected by each of the STAs. According to the example shown in FIG. 12, the STA 2 has selected a smallest backoff count value and the STA 1 has selected a largest backoff count value. In particular, the example of FIG. 12 shows a case that a residual backoff time of the STA 5 is shorter than a residual backoff time of the STA 1 when the STA 2 finishes the backoff count and starts frame transmission. The STA 1 and the STA 5 temporarily stop countdown and standby while the STA 2 is occupying the medium. If the occupation of the STA 2 ends and the medium is back in the idle status, the STA 1 and the STA 5 wait for time as long as the DIFS and then resume the backoff count. In particular, the STA 1 and the STA 5 countdown remaining backoff slot as long as the residual backoff time and may be then able to start the frame transmission. Since the residual backoff time of the STA 5 is shorter than the residual backoff time of the STA 1, the STA 5 starts the frame transmission. Meanwhile, data to be transmitted may also occur in the STA 4 while the medium is occupied by the STA 2. In this case, if the medium is in the idle status, the STA 4 waits for time as long as the DIFS and may be then able to performs countdown according to a random backoff count value selected by the STA 4 and start the frame transmission. The example of FIG. 12 shows a case that the residual backoff time of the STA 5 is coincidentally matched with the random backoff count value of the STA 4. In this case, a collision may occur between the STA 4 and the STA 5. If the collision occurs, since both the STA 4 and the STA 5 cannot receive ACK, data transmission fails. In this case, the STA 4 and the STA 5 select a random backoff count value after enlarging the CW value as much as twice and can perform the countdown. Meanwhile, the STA 1 stand by while the medium is occupied by the STA 4 and the STA 5 due to the transmission. If the medium is back in the idle status, the STA 1 waits for time as long as the DIFS and may be then able to perform the frame transmission when the residual backoff time elapses.

Sensing Operation of STA

As mentioned in the foregoing description, the CSMA/CA mechanism includes a physical carrier sensing directly sensed by the AP and/or the STA. besides the physical carrier sensing, the CSMA/CA mechanism also includes a virtual carrier sensing. The virtual carrier sensing is configured to compensate a problem capable of being occurred in a medium access such as a hidden node problem. In order to perform the virtual carrier sensing, a MAC of a wireless LAN system may use a network allocation vector (NAV). The NAV is a value used for indicating remaining time to an available status of a medium, indicated by an AP and/or an STA currently using the medium or having authority of using the medium for a different AP and/or an STA. Hence, a value configured as the NAV corresponds to a duration for which the use of the medium is reserved by the AP and/or the STA transmitting a corresponding frame. The STA receiving the NAV cannot access the media for the duration. For instance, the NAV can be configured according to a value of a duration field of a MAC header of a frame.

And, in order to reduce possibility of collision, a robust collision detect mechanism has been introduced. Regarding this, it shall be described with reference to FIG. 13 and FIG. 4. Although an actual carrier sensing range and a transmission range may not be identical to each other, for clarity, assume that they are identical to each other.

FIG. 13 is a diagram for explaining a hidden node and an exposed node.

FIG. 13 (a) shows an example of a hidden node. The example shows a case that an STA A is communicating with an STA B and an STA C has information to be transmitted. Specifically, although the example shows a situation that the STA A transmits information to the STA B, before data is transmitted to the STA B by the STA C, it may be determined as a medium is in an idle status when a carrier sensing is performed. This is because transmission (i.e., occupation of the medium) of the STA A may not be sensed in a position of the STA C. In this case, since the STA B receives information of the STA A and information of the STA C at the same time, a collision occurs. In this case, the STA A may be considered as a hidden node of the STA C.

FIG. 13 (b) shows an example of an exposed node. In a situation that an STA B is transmitting data to an STA A, the example shows a case that an STA C has data to be transmitted from an STA D. In this case, if the STA C performs a carrier sensing, it may be determined as a medium is occupied due to the transmission of the STA B. Hence, although the STA C has data to transmit to the STA D, since the medium is sensed as an occupied status, the STA C should wait until the medium becomes the idle status. Yet, since the STA A is positioned at the outside of a transmission range of the STA C, transmission from the STA C and transmission from the STA B may not be collided with each other in terms of the STA A. Hence, the STA C unnecessarily waits until the STA B stops the transmission. In this case, the STA C may be considered as an exposed node of the STA B.

Figure 14:
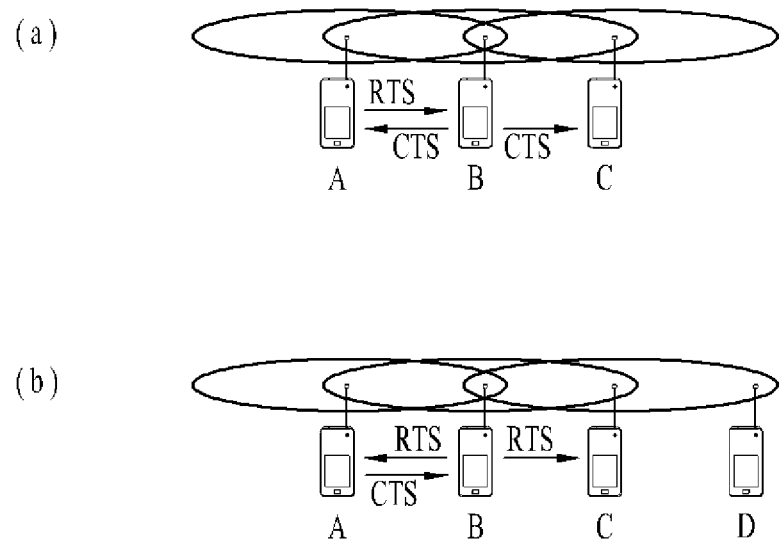
FIG. 14 is a diagram for explaining an RTS and a CTS.

FIG. 14 is a diagram for explaining an RTS and a CTS.

In order to efficiently use a collision avoidance mechanism in a situation shown in the example of FIG. 13, such a short signaling packet as RTS (request to send), CTS (clear to send) and the like can be used. The RTS/CTS between two STAs can make a neighboring STA(s) overhear. By doing so, the neighboring STA(s) can consider whether information is transmitted between the two STAs. For instance, if an STA intending to transmit data transmits an RTS frame to an STA receiving the data, the STA receiving the data transmits a CTS frame to neighboring UEs to inform that the STA receiving the data will receive the data.

FIG. 14 (a) shows an example for a method of solving a hidden node problem and assume a case that both the STA A and the STA C intend to transmit data to the STA B. If the STA A transmits the RTS to the STA B, the STA B transmits the CTS to all STAs around the STA B including the STA A and the STA C. As a result, the STA C waits until the data transmission of the STA A and the STA B ends, thereby avoiding a collision.

FIG. 14 (b) shows an example for a method of solving an exposed node problem. By making the STA C overhear RTS/CTS transmission between the STA A and the STA B, it is able to determine that a collision will not occur although the STA C transmits data to a different STA (e.g., STA D). In particular, the STA B transmits the RTS to all UEs around the STA B and the STA A, which actually has data to be transmitted, transmits the CTS. Since the STA C has received the RTS only and has not received the CTS of the STA A, the STA C is able to know that the STA A is positioned at the outside of carrier sensing of the STC C.

Power Management

As mentioned in the foregoing description, channel sensing should be performed before an STA performs transmission and reception in a wireless LAN system. Yet, sensing a channel all the time causes constant power consumption of the STA. There is no big difference between power consumption in a receiving state and power consumption in a transmitting state. Hence, if the receiving state is continuously maintained, it becomes big burden on an STA operating with a limited power (i.e., battery operated STA). Hence, if the STA maintains a state of reception standby to consistently sense a channel, it leads the STA to inefficiently consume power without any special benefit in terms of a wireless LAN processing ratio. In order to solve the above-mentioned problem, the wireless LAN system supports a power management (PM) mode of the STA.

The power management mode of an STA is divided into an active mode and a power save (PS) mode. An STA basically operates in the active mode. An STA operating in the active mode maintains an awake state. The awake state corresponds to a state in which such a normal operation as frame transmission and reception, channel scanning and the like is feasible. Meanwhile, an STA operating in the PS mode operates in a manner of switching between a sleep state and the awake state. The STA operating in the sleep state operates with minimum power and performs neither frame transmission/reception nor channel scanning.

Since an STA consumes less power in a sleep state, if an STA operates in the sleep state as long as possible, an operating period of the STA increases. Yet, since it is impossible to transmit and receive a frame in the sleep state, it is not possible for the STA to unconditionally operate in the sleep state. If the STA operating in the sleep state has a frame to transmit to an AP, the STA can transmit the frame in a manner of switching to the awake state from the sleep state. Meanwhile, if the AP has a frame to transmit to the STA, the STA operating in the sleep state cannot receive the frame and cannot even know whether there exists the frame to receive. Hence, in order for the STA to know whether there exist a frame to be transmitted to the STA (or, to receive the frame if exists), it may be necessary for the STA to switch to the awake state with a specific period.

Figure 15:
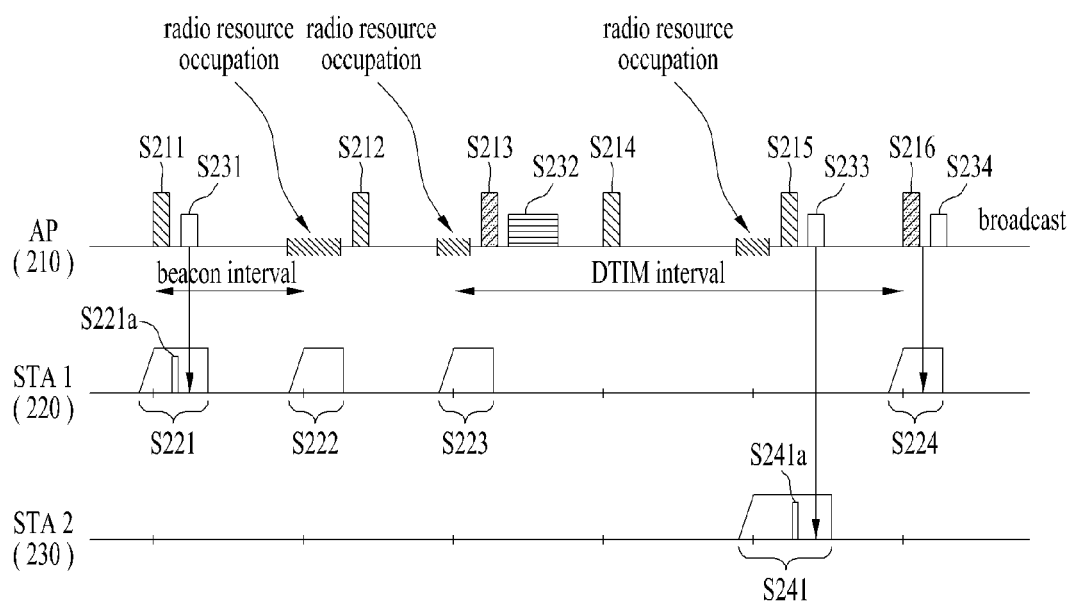
FIG. 15 is a flowchart for explaining a power management operation.

FIG. 15 is a flowchart for explaining a power management operation.

Referring to FIG. 15, an AP 210 transmits a beacon frame to STAs in a BSS with a prescribed interval [S211, S212, S213, S214, S215 and S216]. The beacon frame includes a TIM (traffic indication map) information element. The TIM information element includes information indicating whether there exists buffered traffic for STAs connected to the AP 210 and whether a frame is to be transmitted by the AP. The TIM element can be classified into a TIM used for indicating a unicast frame and a DTIM (delivery traffic indication map) used for indicating a multicast or a broadcast frame.

The AP 210 can transmit one DTIM whenever 3 beacon frames are transmitted.

An STA 1 220 and an STA 2 230 are STAs operating in the PS mode. The STA 1 220 and the STA 230 can be configured to receive the TIM element transmitted by the AP 210 in a manner of switching to the awake state from the sleep state in every wakeup interval of a prescribed period. Each of the STAs can calculate timing of switching to the awake state based on its own local clock. In an example of FIG. 15, assume that a clock of an STA is matched with a clock of an AP.

For instance, the prescribed wakeup interval can be configured to make the STA 1 220 receive the TIM element in every beacon interval in a manner of being switched to the awake state. Hence, when the AP 210 transmits a first beacon frame [S211], the STA 1 220 can switch to the awake state [S221]. The STA 1 220 receives the beacon frame and can obtain the TIM element. If the obtained TIM element indicates that there exists a frame to be transmitted to the STA 1 220, the STA 1 220 can transmit a PS-poll (power save-poll) frame, which makes a request for the AP 210 to transmit a frame, to the AP 210 [S221a]. The AP 210 can transmit the frame to the STA 1 220 in response to the PS-poll frame. Having received the frame, the STA 1 220 operates in a manner of switching to the sleep state again.

When the AP 210 transmits a second beacon frame, since a medium is in a state of being occupied by a different device (busy medium), the AP 210 cannot transmit the beacon frame in accordance with an accurate beacon interval and may transmit the beacon frame on a delayed timing [S212]. In this case, although the STA 1 220 switches the operation mode into the awake mode according to a beacon interval, since the STA 1 is unable to receive the beacon frame transmitted by being delayed, the STA 1 switches to the sleep state again [S222].

When the AP 210 transmits a third beacon frame, the beacon frame may include a TIM element configured as a DTIM. Yet, since the medium is in the state of being occupied (busy medium), the AP transmits the beacon frame in a manner of delaying the transmission [S213]. The STA 1 220 operates in a manner of switching to the awake state in accordance with the beacon interval and can obtain the DTIM via the beacon frame transmitted by the AP 210. Assume a case that the DTIM obtained by the STA 1 220 indicates that there is no frame to be transmitted to the STA 1 220 and there exists a frame for a different STA. In this case, the STA 1 220 checks that there is no frame to be transmitted to the STA 1 and may operate in a manner of switching back to the sleep state. Having transmitted the beacon frame, the AP 210 transmits a frame to a corresponding STA [S232].

The AP 210 transmits a fourth beacon frame [S214]. Yet, since the STA 1 220 was unable to obtain information indicating that there is no buffered traffic for the STA 1 via the TIM element which is previously received twice, the STA 1 can adjust an wakeup interval to receive the TIM element. Or, if signaling information used for adjusting an wakeup interval value of the STA 1 220 is included in the beacon frame transmitted by the AP 210, the wakeup interval value of the STA 1 220 can be adjusted. According to the present example, the STA 1 220 can be configured to switch a management state from a state of switching the management state to receive the TIM element in every beacon interval to a state of switching the management state to the wakeup state in every 3 beacon intervals. Hence, since the STA 1 220 maintains the sleep state when the AP 210 transmits the fourth beacon frame [S214] and a fifth beacon frame [S215], the STA 1 cannot obtain a corresponding TIM element.

When the AP 210 transmits a sixth beacon frame [S216], the STA 1 220 operates in a manner of switching to the awake state and can obtain a TIM element included in the beacon frame [S224]. Since the TIM element corresponds to a DTIM indicating that there exists a broadcast frame, the STA 1 220 can receive a broadcast frame transmitted by the AP 210 instead of transmitting a PS-poll frame to the AP 210 [S234]. Meanwhile, an wakeup interval set to an STA 2 230 can be configured by a period longer than a period of the STA 1 220. Hence, the STA 2 230 switches to the awake state on a timing that the AP 210 transmits the fifth beacon frame [S215] and can obtain the TIM element [S241]. The STA 2 230 knows there exists a frame to be transmitted to the STA 2 via the TIM element and can transmit the PS-poll frame to the AP 210 to make a request for frame transmission. The AP 210 can transmit a frame to the STA 2 230 in response to the PS-poll frame [S233].

In order to manage such a mode as the power saving mode mentioned earlier in FIG. 15, the TIM element can include a TIM indicating whether there exists a frame to be transmitted to an STA or a DTIM indicating whether there exist a broadcast/multicast frame. The DTIM can be implemented by a field configuration of the TIM element.

Figure 16:
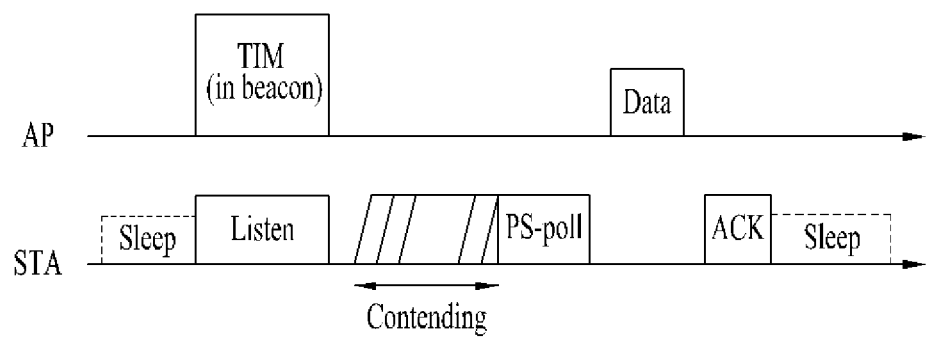
FIGS. 16 to 18 are diagrams for explaining an operation of an STA, which has received a TIM, in detail.
Figure 17:
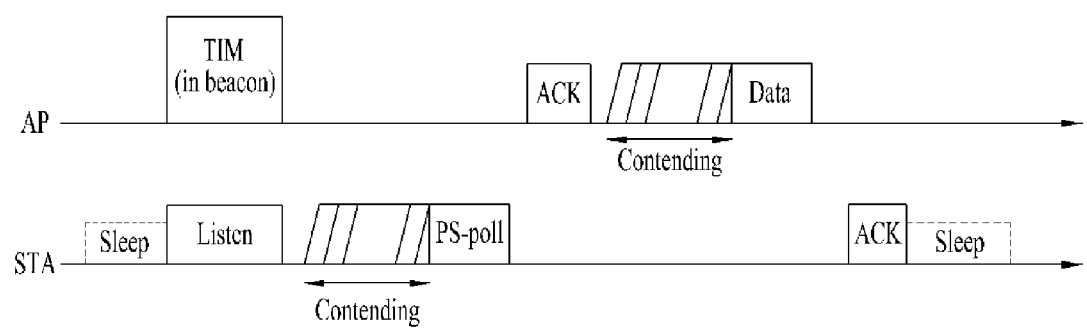
Figure 18:
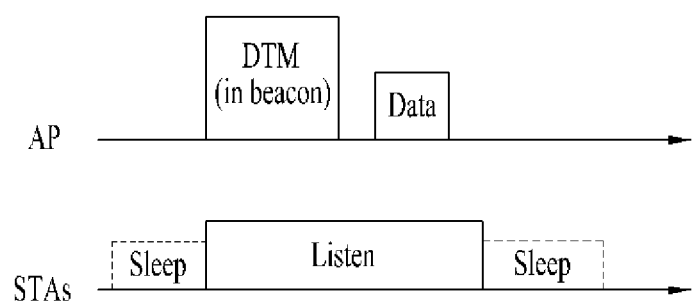

FIGS. 16 to 18 are diagrams for explaining an operation of an STA, which has received a TIM, in detail.

Referring to FIG. 16, an STA switches to an awake state from a sleep state to receive a beacon frame including a TIM from an AP and can know there exists a buffered traffic to be transmitted to the STA by interpreting the TIM element. The STA performs contending with different STAs to access a medium used for transmitting a PS-poll frame and may be then able to transmit the PS-poll frame to the AP to make a request for data frame transmission. Having received the PS-poll transmitted by the STA, the AP can transmit a frame to the STA. the STA receives a data frame and can transmit a confirmation response (ACK) in response to the data frame. Subsequently, the STA can switch back to the sleep state again.

As shown in FIG. 16, having received the PS-poll frame from the STA, the AP can operate according to an immediate response scheme corresponding to a scheme transmitting a data frame in a prescribed time (e.g., SIFS (short inter-frame space) after the PS-poll reception. Meanwhile, after the AP received the PS-poll frame, if a data frame to be transmitted to the STA is not ready for the SIFS time, the AP may operate in accordance with a deferred response scheme. Regarding this, it shall be described with reference to FIG. 17.

In an example of FIG. 17, similar to the operations mentioned in FIG. 16, the STA switches to the awake state from the sleep state, receive the TIM from the AP and transmit the PS-poll frame to the AP by performing contending. Despite receiving the PS-poll frame, if the AP is not ready for a data frame during the SIFS, the AP can transmit an ACK frame to the STA instead of the data frame. After the ACK frame is transmitted, if the data frame is ready, the AP can transmit the data frame to the STA after contending is performed. The STA transmits an ACK frame indicating that the data frame is successfully received to the AP and may be then able to switch to the sleep state.

FIG. 18 shows an example of transmitting a DTIM by the AP. In order for STAs to receive a beacon frame including a DTIM element from the AP, the STAs can switch to the awake state from the sleep state. The STAs are able to know that a multicast/broadcast frame will be transmitted via the received DTIM. Having transmitted the beacon frame including the DTIM, the AP can immediately transmit a data (i.e., multicast/broadcast frame) without an operation of transmitting and receiving a PS-poll frame. Having received the beacon frame including the DTIM, the STAs receive data while maintaining the awake state and can switch back to the sleep state after the data reception is completed.

According to the method of managing the power saving mode, which is based on the TIM (or DTIM) mentioned earlier with reference to FIG. 16 to FIG. 18, STAs can check whether there exists a data frame to be transmitted to the STAs via STA identification information included in the TIM element. The STA identification information may correspond to information related to an AID (association identifier), which is an identifier allocated to an STA when the STA is associated with an AP.

The AID is used as a unique identifier for each STA within a BSS. As an example, according to a current wireless LAN, the AID can be allocated by one of values ranging from 1 to 2007. According to a currently defined wireless LAN system, 14 bits can be allocated for the AID in a frame transmitted by an AP and/or an STA. Although the AID value can be allocated up to 16383, values ranging from 2008 to 16383 are configured as reserved values.

Power Management Using Automatic Power Saving Delivery

Besides the power saving method based on the aforementioned PS-poll, IEEE 802.11e system provides an APSD (automatic power saving delivery) method. The APSD can be mainly classified into a scheduled APSD (s-APSD) method and an unscheduled APSD (u-APSD). The u-APSD indicates a mechanism delivering a downlink frame by an STA supporting the APSD while an AP supporting the APSD operates in a power saving mode in a manner of switching back and forth between an awake state and a sleep (doze) state.

A QoS (quality of service) AP capable of supporting the APSD can signal such capability as the aforementioned to an STA using a beacon, a probe response, an APSD subfield of a capability information field in a (re)association response management frame.

In order for STAs to receive a part or all of a bufferable unit (BU) of the STAs delivered from an AP during an unscheduled service period (hereinafter abbreviated, u-SP), the STAs can use the U-APSD. If the u-SP is not in progress, the u-SP can be started in a manner that an STA transmits a QoS data belonging to an access category (AC) configured as trigger-enabled or a QoS Null frame to the AP. In this case, a transmitted uplink frame is called a trigger frame. An aggregated MPDU (A-MPDU) includes one or more trigger frames. The unscheduled SP is terminated after the AP attempts to transmit an AC capable of being delivered and at least one BU to the corresponding STA. Yet, if a maximum service period length field (MAX SP length field) of a (re)association request frame of the corresponding STA has a value which is not 0, the value of the field is limited to within an indicated value.

In order to receive the BU from the AP during the u-SP, the STA designates one or more delivery-enabled ACs and trigger-enabled ACs of the STA. In order to provide QoS, IEEE 802.11e system defines 8 priorities different from each other and 4 ACs based on the priorities. The STA can configure the AP to use the U-APSD using two methods. First of all, the STA can configure an individual U-APSD flag bit in a QoS info subfield of a QoS capability element delivered in a (re)association request frame. If the U-APSD flag bit corresponds to 1, it indicates that a corresponding AC is a delivery-enabled AC and a trigger-enabled AC. If all 4 U-APSD flag subfields in the (re)association request frame correspond to 1, all ACs related to the STA can be delivered and triggered during the (re)association. If all 4 U-APSD flag subfields in the (re)association request frame correspond to 0, all ACs related to the STA can be delivered during the (re)association and a trigger-enabled AC does not exist. Or, the STA can designate one or more trigger-enabled ACs and delivery-enabled ACs by transmitting a schedule subfield configured by 0 in a traffic stream (TS) information field of an ADDTS (add traffic stream) request frame including an APSD subfield configured by 1 according to an AC to the AP. It is able to put an APSD configuration in a TSPEC request before a static U-APSD configuration delivered in the QoS capability element. In other word, a U-APSD configuration of a prescribed previous AC can be overwrote with the TSPEC request. The corresponding request can be transmitted for an AC where an ACM subfield corresponds to 0.

The STA can configure a trigger-enabled AC or a delivery-enabled AC in a manner of configuring a TSPEC including an APSD subfield and a schedule subfield configured by 1 and 0, respectively in uplink or downlink direction. An uplink TSPEC, a downlink TSPEC or a bidirectional TSPEC including the APSD subfield configured by 1 and the schedule subfield configured by 0 can configure the trigger-enabled AC and the delivery-enabled AC. An uplink TSPEC, a downlink TSPEC or a bidirectional TSPEC including an APSD subfield configured by 0 and the schedule subfield configured by 0 can configure a trigger-disabled AC and a delivery-disabled AC.

A scheduled service period (hereinafter abbreviated, s-SP) starts with a fixed time interval specified in a service interval field. If an access policy controls a channel access, in order for an STA to use the s-SP for TS, the STA can transmit an ADDTS request frame including an APSD subfield configured by 1 of a TS info field in a TSPEC element to an AP. On the contrary, if the access policy supports a contention-based channel access, in order to use the s-SP for the TS, the STA can transmit an ADDTS request frame including the APSD subfield configured by 1 and a schedule subfield of the TS info field in the TSPEC element to the AP. If the APSD mechanism is supported by the AP and the AP accepts the corresponding ADDTS request frame transmitted by the STA, the AP may respond with an ADDTS response frame including a schedule element indicating that a requested service is able to be provided by the AP. If lowest 4 octets of a timing synchronization function are identical to a value specified in a service start time field, an initial s-SP starts. An STA using the s-SP can initially wake up to receive a BU individually addressed buffered for the STA and/or a polled BU from the AP or a hybrid coordinator (HC). Thereafter, the STA can wake up with prescribed time interval identical to a service interval (SI). The AP can adjust service start time via a successful ADDTS response frame (a response for an ADDTS request frame) and a schedule element of a schedule frame (transmitted on a different timing).

The s-SP starts on the service start time indicated in a schedule element transmitted in response to TSPEC and wakeup time scheduled in response to SI. Thereafter, the STA wakes up on timing according to Formula 9 in the following.

$$(\text{TSF service start time}) \bmod \text{minimum SI}=0 \quad \text{[Formula 1]}$$

If an s-SP period is supported in a BSS, an STA can use both U-APSD and S-APSD for ACs different from each other on an identical time. If a scheduled delivery for an AC is set to the STA, an AP does not transmit a BU, which uses the corresponding AC, during SP initialized by a trigger frame and does not process a BU using an AC received from the STA by the trigger frame. The AP does not reject any ADDTS request frame indicating to use both the S-APSD and the U-APSD, which are configured to use an identical AC on an identical time. APSD can be used for delivering an individually addressed BU only. Delivering a BU addressed by group may follow a frame delivery rule used for a group-addressed BU.

A non-AP STA using the U-APSD may not receive all frames transmitted from an AP during a service period due to interference observed in the non-AP STA. In this case, although identical interference is not observed, the AP can determine that the non-AP STA does not properly receive a frame. A U-APSD coexistence capability enables the non-AP STA to indicate transmission duration, which is requested to be used for u-SP, to the AP. By using the transmission duration, the AP can transmit a frame during the SP and the non-AP STA can improve possibility of receiving a frame in an interfered situation. The U-APSD coexistence capability decreases possibility for the AP not to properly receive a frame during a service period.

FIG. 19 is a diagram for an example of a U-APSD coexistence element format.

Referring to FIG. 19, an element ID field is identical to a U-APSD coexistence value. A length of an optional sub-element existing at 12 added to a value of a length field. A value, which is not 0, in a TSF 0 offset field indicates the number of microseconds after time (TSF time 0) on which a non-AP STA is aware that interference has begun. An AP uses the TSF 0 offset field together with an interval/duration field for a transmission to the non-AP STA.

An STA including a value of which 'dot1MgmtOptionUAPSDCoexistenceActivated" is 'true' is defined as an STA supporting U-APSD coexistence. In this case, the STA including the value of which 'dot1MgmtOptionUAPSDCoexistenceActivated" is 'true' configures a U-APSD coexistence field (APSD coexistence field) by 1. Otherwise, the field is configured by 0. (If it is previously notified to both an AP and a non-AP STA that U-APSD coexisting capability is supported), the non-AP STA associated with the STA can transmit an ADDTS request frame including a U-APSD coexistence element to the AP.

Content of the ADDTS request frame not including the U-APSD coexisting element is called a base ADDTS request in the following description. If the ADDTS request frame is successfully received, the AP processes content of the base ADDTS request frame. If the AP determines that the base ADDTS request frame is not able to be approved, the AP does not process the U-APSD coexisting element. On the contrary, if the AP determines that the base ADDTS request frame is able to be approved, the AP processes the U-APSD coexisting element. If the AP supports frame transmission during a U-APSD service period for a value of duration specified in an interval/duration field of the U-APSD coexisting element, the AP can approve the ADDTS request. Otherwise, the AP may reject the ADDTS request.

When the AP previously approved an ADDTS request including the U-APSD coexistence, the non-AP STA continuously using a QoS service, which is provided by the ADDTS request frame not including the U-APSD coexistence, can terminate the use of the U-APSD coexistence in a manner of transmitting the ADDTS request frame not including the U-APSD coexistence element. If the non-AP STA intends to terminate the use of all QoS services provided by the ADDTS request frame including the U-APSD coexistence, the non-AP STA can transmit a DELTS (delete traffic stream) request frame to the AP.

If a previous ADDTS request frame is invalidated by a last successfully received ADDTS request frame, the non-AP STA can transmit multiple ADDTS request frames to the AP. The AP supporting the U-APSD coexistence and accepting an ADDTS request can limit U-APSD coexistence service period according to a parameter specified in the U-APSD coexisting element of the ADDTS frame. And, the AP transmits a frame to make a request for the non-AP STA in accordance with a rule in the following.

First of all, if the non-AP STA specifies a TSF 0 offset value by a value which is not 0 in the U-APSD coexistence element, the AP does not transmit a frame to the non-AP STA in the outside of the U-APSD existence service period. The U-APSD existence service period starts when the AP receives a U-APSD trigger frame and ends after a transmission period specified by Formula 10 in the following.

$$\text{End of transmission period}=T+(\text{Interval}-((T\text{TSF0Offset})\text{mod Interval})) \quad [\text{Formula 2}]$$

In Formula 2, T indicates time of receiving the U-APSD trigger frame by the AP. And, interval indicates a firstly appearing value among a duration/interval field value of the U-APSD coexistence element and timing on which an EOSP (end of service period) bit configured by 1 is successfully transmitted.

On the contrary, if the non-AP STA specifies the TSF 0 offset value by 0 in the U-APSD coexistence element, the AP does not transmit a frame to the non-AP STA in the outside of the U-APSD existence service period. The U-APSD existence service period starts when the AP receives a U-APSD trigger frame and ends after a transmission period specified by Formula 11 in the following.

$$\text{End of transmission period}=T+\text{Duration} \quad [\text{Formula 3}]$$

In Formula 3, T indicates time of receiving the U-APSD trigger frame by the AP. And, Duration indicates a firstly appearing value among a duration/interval field value of the U-APSD coexistence element and timing on which an EOSP (end of service period) bit configured by 1 is successfully transmitted.

If the AP determines that the AP has a frame to transmit more during the U-APSD coexistence service period and the frame will be successfully transmitted before the service period expires, an additional (more) bit can be configured by 1.

If a frame is anticipated as a last frame to be transmitted to the non-AP STA during the U-APSD coexistence service period, the AP can configure the EOSP bit by 1 in the corresponding frame. If the last frame is not successfully transmitted to the non-AP STA before the U-APSD coexistence service period expires, the AP transmits a QoS null frame of which the EOSP bit is configured by 1. The non-AP STA can enter a doze state when the U-APSD coexistence service period expires.

TIM Element Structure

FIG. 20 is a diagram for an example of a TIM element format.

Referring to FIG. 20, a TIM element can include an element ID field, a length field, a DTIM count field, a DTIM period field, a bitmap control field and a partial virtual bitmap field. The length field indicates length of an information field. The DTIM count field indicates how many beacon frames (including a current frame) exist before a next DTIM is transmitted. The TIM period field indicates the number of beacon intervals between contiguous DTIMs. If all TIMs correspond to a DTIM, the DTIM period field has a value of 1. The DTIM period value is reserved by 0 and configured by 1 octet. The bitmap control field consists of one octet. A bit 0 of the bitmap control field is a traffic indicator bit for AID 0. If one or more group addressed MSDUs (MAC service data unit)/MMPUDs (MAC management protocol data unit) have data to transmit in an AP or a mesh STA, the DTIM count field is set to 0 and the bit 0 of the bitmap control field is set to 1. Remaining 7 bits of the first octet indicates a bitmap offset. A traffic indication virtual bitmap indicated by an AP generating a TIM or the mesh STA is consisted of 2008 bits (=251 octets). A bit number N (where $0 \leq N \leq 2007$) of a bitmap can be indicated by an octet number N/8 and a bit number (N mod 8). Each bit of the traffic indication virtual bitmap indicates whether there exist data to be transmitted by an AP. If there exist data to be transmitted by the AP for an individually addressed MSDU/MMPDU (AID=N), the bit number N is set to 1. If there does not exist data to be transmitted, the bit number N is set to 0.

The above-mentioned fields correspond to an example of fields capable of being included in a TIM element. Each of the fields can be replaced with a different field or an additional field can be further included.

As an example of a method of compressing a bitmap of a TIM element, it may consider a method of changing (reassigning) an AID of an STA according to a traffic pattern. Regarding this, it shall be described with reference to FIG. 21 in the following.

FIG. 21 is a diagram for an example of compression of a TIM element using dynamic AID assignment.

Referring to FIG. 21, if an AP has data to transmit to an STA, a bit indicating an AID of the STA in a bitmap of a TIM element is set to 1. If the AP does not have data to transmit to the STA, the bit indicating the AID of the STA in the bitmap of the TIM element is set to 0. On the contrary, if the AP has data to transmit to the STA, the bit indicating the AID of the STA in the bitmap of the TIM element may be set to 0. If the AP does not have data to transmit to the STA, the bit indicating the AID of the STA in the bitmap of the TIM element may be set to 1. FIG. 21 shows an example that the AP has data to transmit to STAs to which AID 2, 6 and 10 are assigned. In this case, if an AID of an STA to which the AID 6 is assigned is modified (reassigned) into 1 and an AID of an STA to which the AID 10 is assigned is modified (reassigned) into 3, a size of the bitmap configuring the TIM element can be reduced. Specifically, if the AP has data to transmit to the STAs to which original AID 2, 6 and 10 are assigned, according to a legacy TIM element, bits, which are positioned between the bits indicating the AIDs of the STAs in which data exist, should be included in the bitmap to indicate the STAs. For instance, the bits (bits indicating original AID 3 to 5) positioned between the bit indicating the original AID 2 and the bit indicating the original AID 6 and the bits (bits indicating original AID 7 to 9) positioned between the bit indicating the original AID 6 and the bit indicating the original AID 10 should be included in the bitmap. Yet, if the AIDs of the STAs in which data to be transmitted by the AP exist are changed (reassigned) in a manner of being contiguously configured, since the bitmap is configured by excluding bits positioned between bits indicating modified AIDs, the size of the bitmap can be reduced.

When an AID assigned to an STA is dynamically changed according to a traffic patter and the like, in order to efficiently reduce a size of a bitmap according to the change of the AID, it is preferable to assign AIDs to the STAs with a prescribed space between the AIDs rather than contiguously assign the AIDs to the STAs. Yet, in case of assigning the AIDs to the STAs with a prescribed space between the AIDs, a size of a whole bitmap may increase. Hence, it may also be necessary to change a bitmap encoding scheme to be suitable for the aforementioned content.

The present invention proposes a structure of a TIM element used for not only effectively supporting the aforementioned dynamic AID assignment but also efficiently compressing a bitmap.

Enhanced TIM Structure

Figure 22:
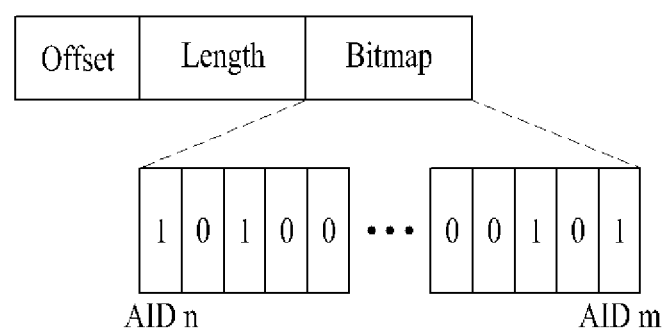
FIG. 22 is a diagram for explaining a format of a TIM element.

FIG. 22 is a diagram for explaining a format of a TIM element.

Referring to FIG. 22, an example of a bitmap form of a TIM element used for informing whether there exist downlink data buffered for STAs belonging to a range ranging from AID n to AID m is shown.

A TIM element can be configured in a manner of including an offset field, a length field and a bitmap field. These fields can be included in a partial virtual bitmap field of the TIM element mentioned earlier in FIG. 20. Each of the fields corresponds to an example of fields capable of being included in the TIM element. Each field can be replaced with a different field and an additional field can be further included.

The offset field means a start of a bitmap. In particular, the offset field indicates a start point of an AID range where traffic is indicated by a corresponding TIM element. In an example of FIG. 22, since the TIM element corresponds to a TIM element for STAs belonging to a range ranging from an AID n to an AID m, the offset field has a value of the AID n. The length field indicates a length of a bitmap. In particular, the length field indicates the AID range where traffic is indicated by a corresponding TIM element. In this case, a unit (e.g., octet) of the length field can be represented by a configuration unit of a bitmap. In FIG. 22, the length field has values indicating a range (or numbers) ranging from the AID n to the AID m. The bitmap field indicates whether an AP stores downlink data buffered for STAs belonging to a range ranging from an AID indicated by the offset field value to an AID indicated by the length field by 0 or 1. In FIG. 22, the bitmap field indicates whether an AP stores downlink data buffered for the STAs belonging to the range ranging from the AID n to the AID m by 0 or 1.

In this case, a method of configuring a bitmap can be mainly classified into two. First of all, when a bitmap is configured in a manner that each of bits included in the bitmap respectively indicates an AID corresponding to the each bit, it is able to configure the bitmap for sequentially increasing AIDs as much as 1. This sort of method may be named a sequential bitmap. And, when a bitmap is configured in a manner that each of bits included in the bitmap respectively indicates an AID corresponding to the each bit, it is able to configure the bitmap for sequentially increasing AIDs as much as a prescribed value (hereinafter, this is called delta). This sort of method may be named a linear bitmap. Regarding this, it shall be described with reference to FIG. 23 in the following.

FIG. 23 is a diagram for explaining a bitmap format of a TIM element according to one embodiment of the present invention.

FIG. 23 (*a*) shows an example of a sequential bitmap and FIG. 23 (*b*) shows an example of a linear bitmap. Similar to FIG. 22, FIG. 23 shows an example of a bitmap for STAs belonging to a range ranging from an AID n to an AID m.

In case of a sequential bitmap, a first position of the bitmap indicates a traffic indication for an STA (in FIG. 23, an STA to which an AID n is assigned) including an AID value indicated by an offset field. The traffic indication can be indicated for STAs including a sequentially increasing AID value as much as 1 from the first bit position of the bitmap via contiguous bitmap positions. FIG. 23 shows that an AP stores frames (downlink data) buffered for STAs to which an AID n and an AID n+8 are assigned, respectively.

Similar to the sequential bitmap, in case of a linear bitmap, a first position of the bitmap indicates a traffic indication for an STA (in FIG. 23, an STA to which an AID n is assigned) including an AID value indicated by an offset field. Yet, the traffic indication can be indicated for STAs including increasing AID value as much as delta from the first bit position of the bitmap via contiguous bitmap positions. In FIG. 23, a delta value corresponds to 8. FIG. 23 shows that an AP stores frames (downlink data) buffered for STAs to which an AID n and an AID n+8 are assigned, respectively. In this case, the delta value may correspond to a value equal to or less than a bitmap configuration unit (e.g., a divisor of the bitmap configuration unit). In case of applying a linear bitmap encoding scheme, an AP may inform an STA of a delta value in an association process via system information. Or, the AP may inform the STA of the delta value via a corresponding TIM element.

When a configuration unit of a bitmap corresponds to 1 octet (8 bits), if a sequential bitmap is used, 2 octets are required for a bitmap encoding. Yet, if a linear bitmap is used, 1 octet is sufficient for the bitmap encoding. This is because, since the AP has no traffic buffered for STAs including an AID n+1, an AID n+9, an AID n+17, an AID n+25, an AID n+33, an AID n+41, an AID n+49 and an AID n+57, corresponding part can be excluded when a bitmap is configured. In this case, as mentioned in the foregoing description, if a configuration unit of a bitmap corresponds to 1 octet, a unit of a length field may correspond to octet as well. Hence, a length field value of a sequential bitmap becomes 2 and a length field value of a linear bitmap becomes 1.

Meanwhile, a TIM element according to a legacy definition is not suitable for application of an M2M application where the great number (e.g., exceeding 2007) of STAs are capable of being associated with one AP. In case of extending a structure of the legacy TIM element as it is, it is not able to support the structure with a legacy frame format since a bitmap size of the TIM element is extended too much. And, the TIM element according to the legacy definition is not appropriate for M2M communication considering an application of a low transmission rate. And, it is expected that there is few STA including a reception data frame in one beacon interval in the M2M communication. Hence, considering the above-mentioned application example of the M2M communication, it is expected that most of bits will have value of 0 although a size of a bitmap of a TIM element is extended. Hence, it is necessary to have a technology of efficiently compressing a bitmap.

To this end, it is able to make a TIM element have a hierarchical structure. Regarding this, it shall be described with reference to FIG. 24 in the following.

Figure 24:
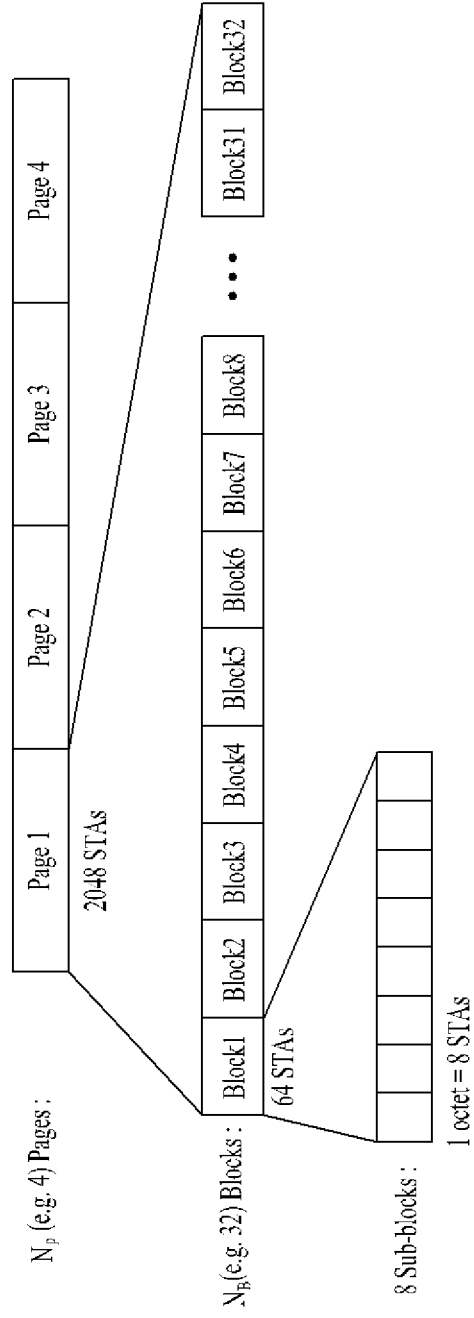
FIG. 24 is a diagram for explaining a hierarchical structure of a TIM element.

FIG. 24 is a diagram for explaining a hierarchical structure of a TIM element.

FIG. 24 shows an example of a hierarchical structure of a TIM element including a layer of 3 levels. In the structure of the layer of 3 levels, a total AID space capable of maximally supporting STAs is divided into a plurality of page groups and each of a plurality of the page groups is divided into a plurality of blocks. And, each of a plurality of the blocks can be divided into a plurality of sub-blocks. Although the example shown in FIG. 24 shows the layer of 3 levels, a TIM element of a hierarchical structure can be configured by a form of 2 levels or a form of more than 3 levels. In the example of FIG. 24, the total AID space is divided into total 4 page groups, one page group is divided into 32 blocks and one block can be divided into 8 sub-blocks. If one sub-block has a size of 1 octet, one sub-block can support 8 STAs, one block can support 64 (8*8) STAs and one page group can support total 2048 (64*32) STAs. Yet, the example of FIG. 24 is just an example. The number of page groups by which the total AID space is divided, the number of blocks by which one page group is divided and the number of sub-blocks by which one block is divided can be differently configured.

As mentioned in the foregoing description, AID(s) belonging to a specific page group can be included in one TIM element by dividing the total AID space into a plurality of page groups. A channel access of STA(s) corresponding to AID(s) belonging to a specific page group is permitted only for a specific time interval (e.g., a beacon interval including a corresponding TIM element) and a channel access of remaining STA(s) can be restricted for the specific time interval. In particular, a prescribed time interval permitted to a specific STA(s) only can be named a RAW (restricted access window). By permitting a channel access to STA(s) corresponding to a specific page group only for a specific time interval, a channel access can be permitted according to a page group on a different time interval. By doing so, a TIM element shortage problem for many numbers of STAs can be solved and efficient data transmission/reception can be performed.

As mentioned in the foregoing description, if a TIM element is configured by a hierarchical structure, an AID structure can be determined based on the TIM element including the hierarchical structure. Regarding this, it shall be described with reference to FIG. 25 in the following.

Figure 25:
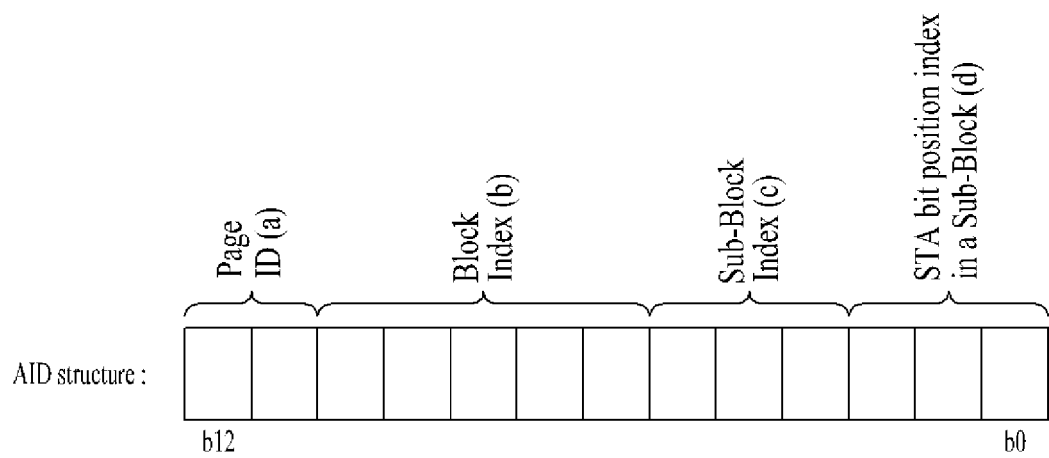
FIG. 25 is a diagram for an example of an AID structure according to a structure of a hierarchical TIM element.

FIG. 25 is a diagram for an example of an AID structure according to a structure of a hierarchical TIM element.

Referring to FIG. 25, it shows an example of an AID based on a TIM element, which is configured under an assumption that the TIM element is configured by a layer of 3 levels. The AID can be configured by a page group identifier, a block index, a sub-block index and bits used for indicating a bit position index of a corresponding STA in a sub-block according to a hierarchical structure of the TIM element. In particular, several bits of the front of the AID, next several bits, next several bits and next several bits can indicate a page group, a block index, a sub-block index and a bit position index of a corresponding STA in a sub-block, respectively. In an example shown in FIG. 25, first 2 bits of the AID indicates a page group identifier among the total 4 page groups, next 5 bits indicates a block index among the total 32 blocks, next 3 bits indicates a sub-block index among the total 8 sub-blocks and next 3 bits indicates a bit position index of a corresponding STA in a sub-block. Hence, an AID can be assigned to an STA in a manner of being group by a page group, a block and a sub-block. By doing so, the STA can check a bit position indicating the STA in a bitmap of the TIM element via the AID assigned to the STA.

As mentioned in the foregoing description, when a TIM element is configured by a hierarchical structure, a bitmap of the TIM element can be configured in a manner of being divided into sub-bitmaps (sub-block bitmaps). Regarding a format of the TIM element, it shall be described with reference to FIG. 26 in the following.

Figure 26:
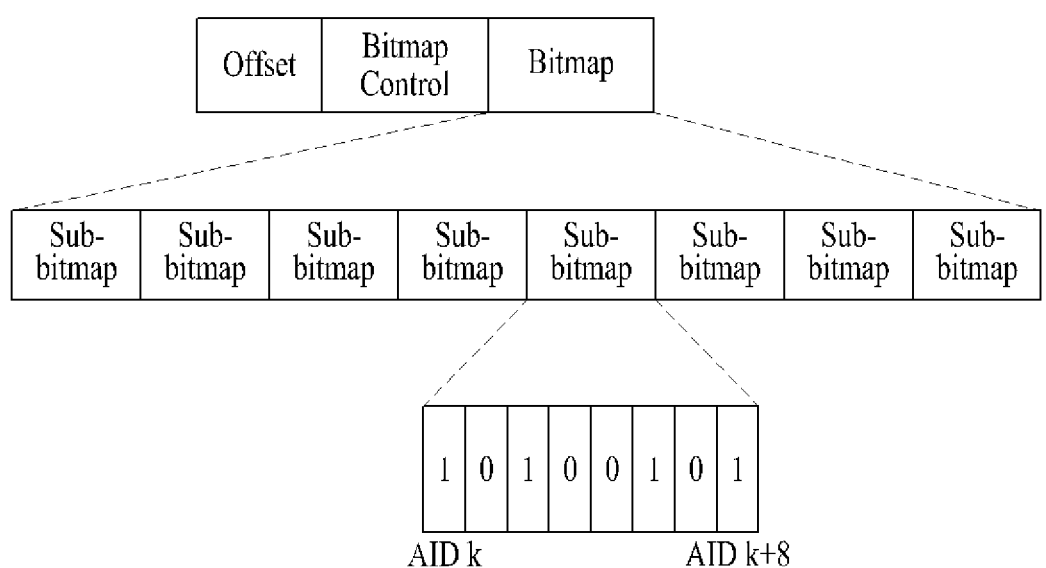
FIG. 26 and FIG. 27 are diagrams for examples of a format of a TIM element including a hierarchical structure.

FIG. 26 is a diagram for an example of a format of a TIM element including a hierarchical structure.

FIG. 26 shows an example of a bitmap form of a TIM element indicating whether there exist downlink data buffered for STAs belonging to a range ranging from an AID n to an AID m.

A TIM element can be configured in a manner of including an offset field, a bitmap control field and a bitmap field. The offset field means a start of a bitmap. In particular, the offset field means a start point of an AID range where traffic is indicated by the TIM element. In an example of FIG. 22, since the TIM element indicates TIM element for STAs belonging to a range ranging from an AID n to an AID m, the offset field has a value of the AID n. The bitmap control field is used for the purpose of indicating sub-bitmap to show which sub-bitmaps are used to configure the bitmap field. In particular, the bitmap field can be configured by the sub-bitmaps indicated by the bitmap control field. For instance, as shown in FIG. 26, when it is assumed that there is 8 sub-bitmaps capable of being included in the bitmap field, if the bitmap control field includes 1, 0, 1, 0, 0, 0, 0, 0, it means that the bitmap field is configured by a first sub-bitmap and a third sub-bitmap only.

Each of the fields corresponds to an example of fields capable of being included in the TIM element. Each field can be replaced with a different field and an additional field can be further included. For instance, in the example shown in FIG. 20, if the partial virtual bitmap field of the TIM element is encoded by a block level, the partial virtual bitmap field can include one or more blocks included in one page group and each of the aforementioned fields can be included in one block. In this case, the offset field and the bitmap control field can be replaced with a block offset field and a block control field or a block bitmap field, respectively. Regarding this, it shall be described with reference to FIG. 27 in the following.

Figure 27:
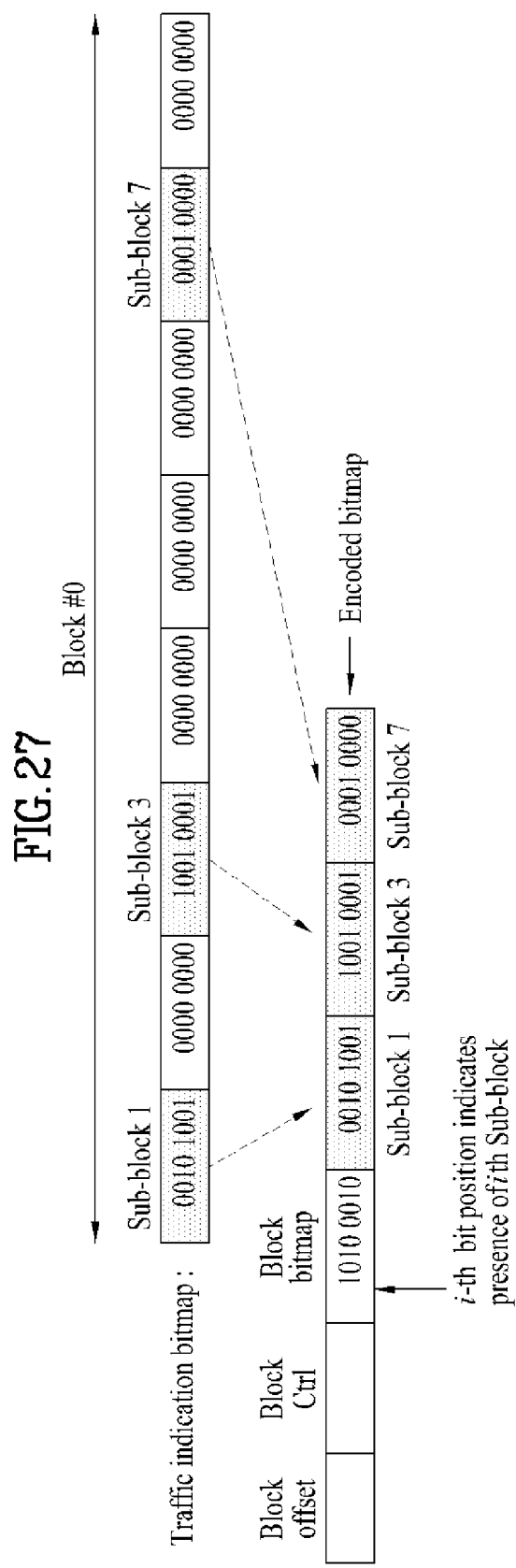

FIG. 27 is a diagram for an example of a format of a TIM element including a hierarchical structure.

Referring to FIG. 27, a plurality of AIDs are indicated by one sub-block and a plurality of sub-blocks are indicated by one block. In an example of FIG. 27, one sub-block covers 8 AIDs and one block covers 8 sub-blocks.

A TIM element can be configured in a manner of including a block offset field, a block control field, a block bitmap field and a bitmap field (or sub-block field). The block offset field is used for the purpose of indicating a position of a block in a bitmap of the total TIM element. In case that there exist various methods of indicating the TIM element (or bitmap encoding schemes), the block control field is used for the purpose of indicating the method of indicating the TIM element. If there exists a sub-block (or sub-block bitmap) to which an AID paged by contiguous bit positions belongs thereto from a first bit position, the block bitmap field indicates the sub-block. In particular, an $n^{th}$ bit of the block bitmap field indicates whether there exists a bitmap of an $n^{th}$ sub-block in the bitmap field. In an example of FIG. 27, a first, a third and a seventh sub-block correspond to the sub-block. The block bitmap field has 1, 0, 1, 0, 0, 0, 1, 0 to indicate the sub-blocks. An m-th bit position of a sub-block bitmap indicates whether an m-th STA has data buffered for an AP.

In FIG. 27, since a 8-byte traffic indication bitmap block can be compressed to a 5-byte encoded bitmap using a block bitmap encoding scheme, overhead of a TIM can be reduced.

In general, in order to transmit a TIM in a manner of being included in a beacon frame and in order for most STAs within a BSS to receive the beacon frame including the TIM, a low MCS (modulation and coding scheme) should be applied. In this case, in terms of efficient utilization of a resource, it would be mandatory to reduce a size of the TIM.

As mentioned in the foregoing example, in case of using the block bitmap encoding scheme, overhead of a TIM can be reduced. Yet, when the number of sub-block bitmaps indicated by one block is small, overhead configured to indicate a sub-block bitmap occupies a considerable part compared to an actually delivered sub-block bitmap.

For instance, if there exists one sub-block bitmap per block, overhead (block control of 3 bits, block offset of 5 bits and block bitmap of 1 byte) of 2 bytes are added to a sub-block bitmap of 1 byte. In particular, when information of 1 byte is transmitted, 2 bytes are additionally added. In particular, overhead of 200% occurs. If there exist two sub-block bitmaps per block, since 2 bytes are additionally added (block control of 3 bits, block offset of 5 bits and block bitmap of 1 byte) to sub-block bitmaps of 2 bytes, overhead of 100% may occur. If there exist three sub-block bitmaps per block, since 2 bytes are additionally added (block control of 3 bits, block offset of 5 bits and block bitmap of 1 byte) to sub-block bitmaps of 3 bytes, overhead of 50% may occur.

Figure 28:
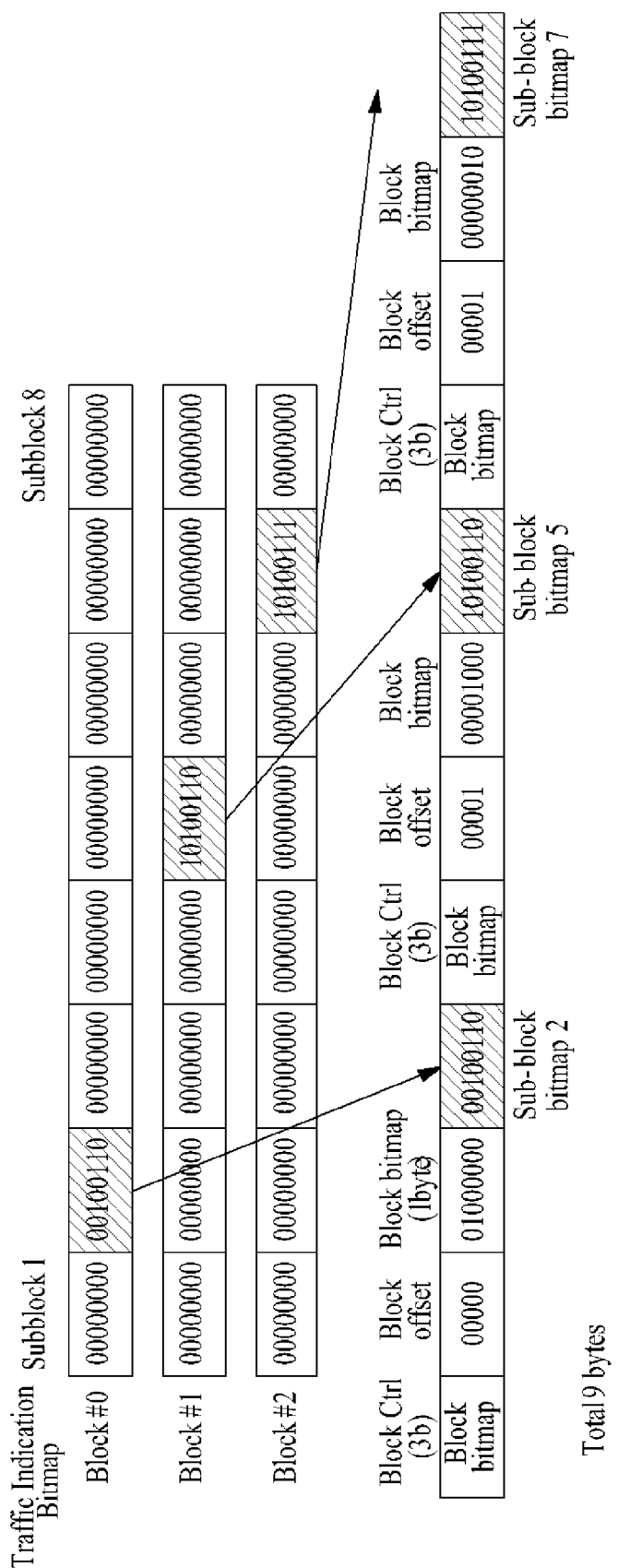
FIG. 28 is a diagram for explaining an example of overhead occurring when a subblock bitmap per block is indicated in three contiguous blocks.

FIG. 28 is a diagram for explaining an example of overhead occurring when one sub-block bitmap per block is indicated in three contiguous blocks. In FIG. 28, assume that one sub-block per each block is indicated. As shown in an example of FIG. 28, since one block control field, one block offset field and one block bitmap field are used for one block, overhead of minimum 6 bytes ((3 bits (block control field)+5 bits (block offset field)+1 byte (block bitmap field))*3) should be added to compress 3 blocks. Since one sub-block per block is indicated, overhead of 6 bytes should be added to indicate a sub-block of 3 bytes.

As mentioned in the foregoing description, if the number of bitmaps indicated in a random block is small, since overhead is greater than data to be transmitted, a problem that transmission rate becomes worse occurs. In order to solve the problem, the present invention proposes an enhanced encoding scheme in the following.

Enhanced Encoding Scheme

The present invention proposes an enhanced encoding scheme capable of indicating N (N is a natural number equal to or greater than 2) number of blocks. In this case, the N may correspond to a value fixed in a system or a value randomly selected by an STA. If the N is fixedly managed by a system, a long block bitmap encoding scheme can be applied. If the N is managed in a manner of being randomly selected by an STA, a multiple block bitmap encoding scheme can be applied. Each of the encoding schemes is explained in detail in the following.

Embodiment 1 -long block bitmap encoding scheme

A TIM element to which a long block bitmap encoding scheme is applied can be used for indicating N number of blocks fixed by a system. To this end, a block control field can indicate that there exist maximum N numbers of contiguous block bitmaps. The block bitmap field may have a size of N*8 bits. As an example, if the N corresponds to 2, the block bitmap field may have a size of 16 bits. If the N corresponds to 3, the block bitmap field may have a size of 24 bits.

Consequently, the TIM element to which the long block bitmap encoding scheme is applied can include a block control field of 3 bits, a block offset field of 5 bits, a block bitmap field of N*8 bits and a sub-block bitmap field of a size, which is variable according to the number of indicated sub-blocks.

Figure 29:
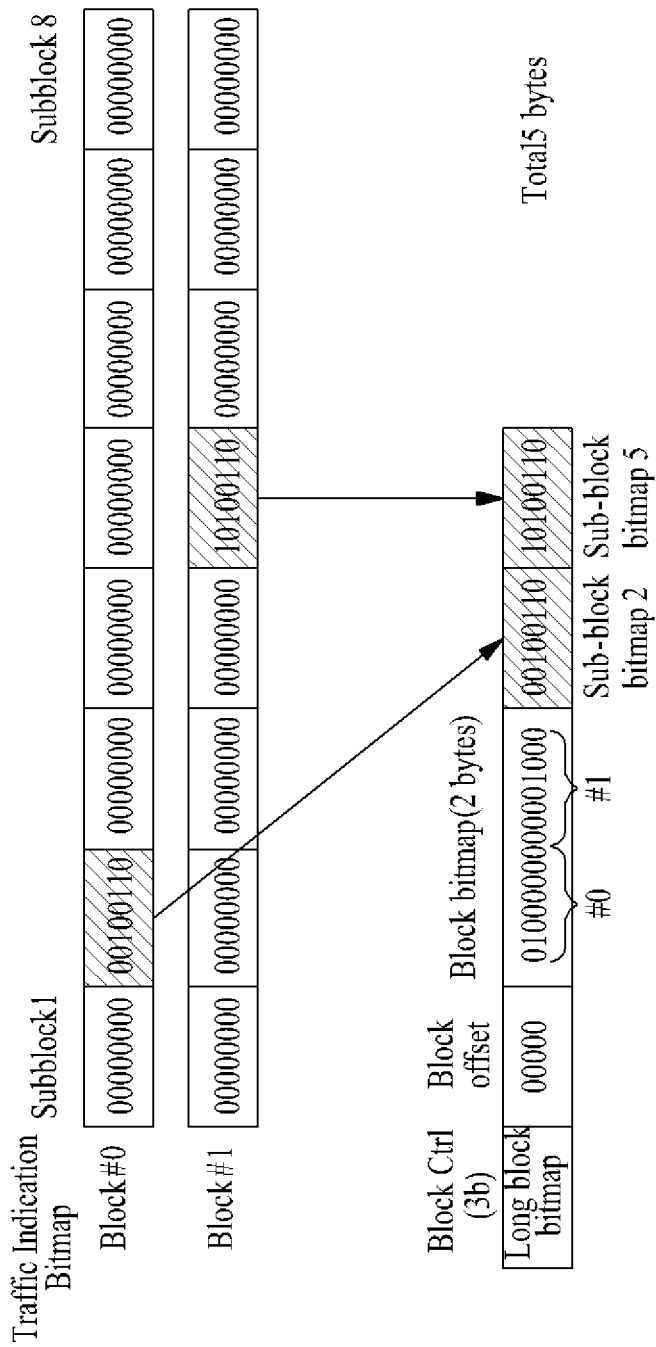
Figure 31:
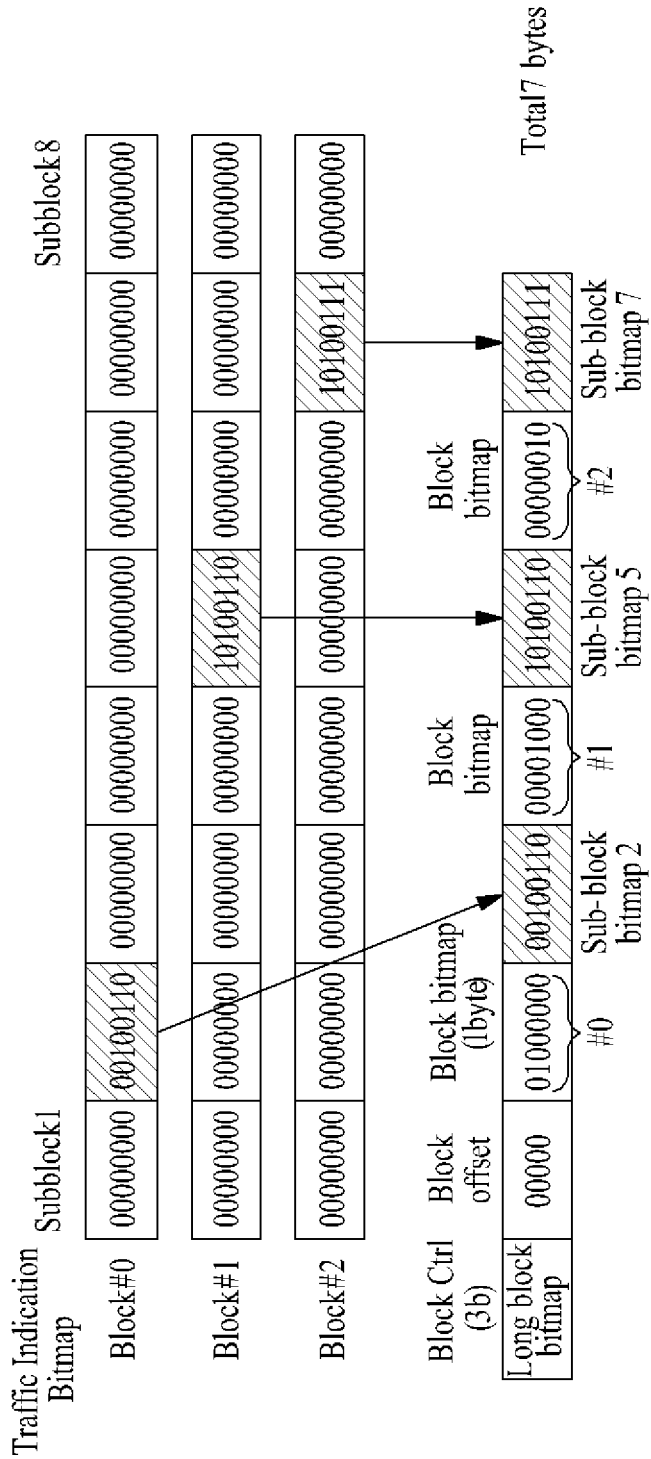

FIGS. 29 to 31 are diagrams for explaining examples of a long block bitmap encoding scheme.

FIG. 29 shows a TIM element in case that N corresponds to 2 and FIG. 30 shows a TIM element in case that N corresponds to 3. For clarity of explanation, assume that there is one sub-block including an AID, which is paged in each block.

As shown in an example of FIG. 29, a TIM element, which is used for indicating 2 blocks and applied a long block bitmap encoding scheme, can include a block control field of 3 bits, a block offset field of 5 bits and a block bitmap field of 2 bytes. In FIG. 29, since one block has an AID in which one sub-block is paged, one sub-block field has a size of total 2 bytes.

The block control field indicates that the TIM element is encoded by the long block encoding scheme. An STA checks an encoding scheme indicated by the block control field and may be then able to recognize that the TIM element indicates the N number of blocks.

The block bitmap field indicates a sub-block (or sub-block bitmap) to which any AID paged in N number of blocks belongs thereto. The block bitmap field can indicate one block in 8-bit unit. As an example, as shown in FIG. 29, in order to indicate two blocks, the block bitmap field should have a length of minimum 16 bits. And, as shown in FIG. 30, in order to indicate three blocks, the block bitmap field should have a length of minimum 24 bits.

Hence, in FIG. 29, it may be comprehended as the first 8 bits (#0) are used for indicating sub-blocks of a first block (block #0) and remaining 8 bits are used for indicating sub-blocks of a second block (block #1).

In an example shown in FIG. 29, since a sub-block 2 of the first block and a sub-block 5 of the second block have a paged AID, the block bitmap field may have a value of 0, 1, 0, 0, 0, 0, 0, 0, 0, 0, 0, 0, 1, 0, 0, 0.

In case of using a legacy encoding scheme, 2 blocks can be indicated using 2 TIM elements including a block control field of 3 bits, a block offset field of 5 bits and a block bitmap field of 1 byte. As shown in the example of FIG. 29, in case of using the long block bitmap encoding scheme, since 3 bytes are additionally required only except the sub-block bitmap field (3 bits (block control field)+5 bits (block offset field)+2 bytes (block bitmap field)), it is able to obtain a gain of 1 byte compared to the legacy encoding scheme requiring additional 4 bytes ({3 bits (block control field)+5 bits (block offset field)+1 byte (block bitmap field)}*2).

As shown in an example of FIG. 30, a TIM element, which is used for indicating 3 blocks and applied a long block bitmap encoding scheme, can include a block control field of 3 bits, a block offset field of 5 bits and a block bitmap field of 3 bytes. In FIG. 30, since one block has an AID in which one sub-block is paged, one sub-block field has a size of total 3 bytes.

In this case, the first 8 bits (#0) of the block bitmap field are used for indicating sub-blocks of a first block (block #0), next 8 bits (#1) are used for indicating sub-blocks of a second block (block #1) and remaining 8 bits can be used for indicating sub-blocks of a third block (block #2).

In an example shown in FIG. 30, since a sub-block 2 of the first block, a sub-block 5 of the second block and a sub-block 7 of the third block have a paged AID, the block bitmap field may have a value of 0, 1, 0, 0, 0, 0, 0, 0, 0, 0, 0, 0, 1, 0, 0, 0, 0, 0, 0, 0, 0, 0, 1, 0.

In case of using a legacy encoding scheme, 3 blocks can be indicated using 3 TIM elements including a block control field of 3 bits, a block offset field of 5 bits and a block bitmap field of 1 byte. As shown in the example of FIG. 30, in case of using the long block bitmap encoding scheme, since 4 bytes are additionally required only except the sub-block bitmap field (3 bits (block control field)+5 bits (block offset field)+3 bytes (block bitmap field)), it is able to obtain a gain of 2 bytes compared to the legacy encoding scheme requiring additional 6 bytes ({3 bits (block control field)+5 bits (block offset field)+1 byte (block bitmap field)}*2).

In case of using the legacy encoding scheme to indicate the N number of blocks, the TIM element requires a size of N*2 bytes except the sub-block bitmap field. On the contrary, in case of using the long block bitmap encoding scheme, the TIM element requires a size of 1 byte (block control field of 3 bits and block offset field of 5 bits)+N*1 byte (block bitmap field) except the sub-block bitmap field. Hence, the long block bitmap encoding scheme can obtain a gain of N−1 byte compared to the legacy encoding scheme.

FIG. 29 and FIG. 30 shows examples that the TIM element includes one block bitmap field of N bytes. On the contrary, a block bitmap size field of 1 byte can be repeatedly positioned one by one. For instance, as shown in an example of FIG. 31, if a size of the block bitmap field indicated by the block bitmap size field corresponds to 3 bytes, the block bitmap field and the sub-block bitmap filed can be repeatedly positioned by four times. In the example shown in FIG. 31, a first block bitmap field (#0) is used for indicating a first block (#0) and a second block bitmap field (#1) can be used for indicating a second block (#1). In particular, an N-th block bitmap field can be used for indicating an N-th block.

Although FIG. 31 shows an example that a size of all sub-block bitmap fields positioned between the block bitmap fields corresponds to 1 byte, the size of the sub-block bitmap fields may vary according to the number of sub-blocks including a paged AID in a block.

Embodiment 2 -multiple block bitmap encoding scheme

A TIM element to which a multiple block bitmap encoding scheme is applied can be used for indicating N number of blocks which are subjectively determined by an AP. To this end, a block bitmap size field can be further included in the TIM element to which the multiple block bitmap encoding scheme is applied compared to the TIM element to which the long block bitmap encoding scheme is applied.

The block bitmap size field indicates a size of a block bitmap field. Specifically, the block bitmap size field can indicate the size of the block bitmap field in a byte unit or a block unit. Specifically, in case that the TIM element indicates N number of blocks, the block bitmap size field can indicate that the size of the block bitmap field corresponds to N bytes. For instance, if the TIM element is configured to indicate 4 blocks, the block bitmap size field can indicate that the block bitmap field corresponds to 4 bytes.

Figure 32:
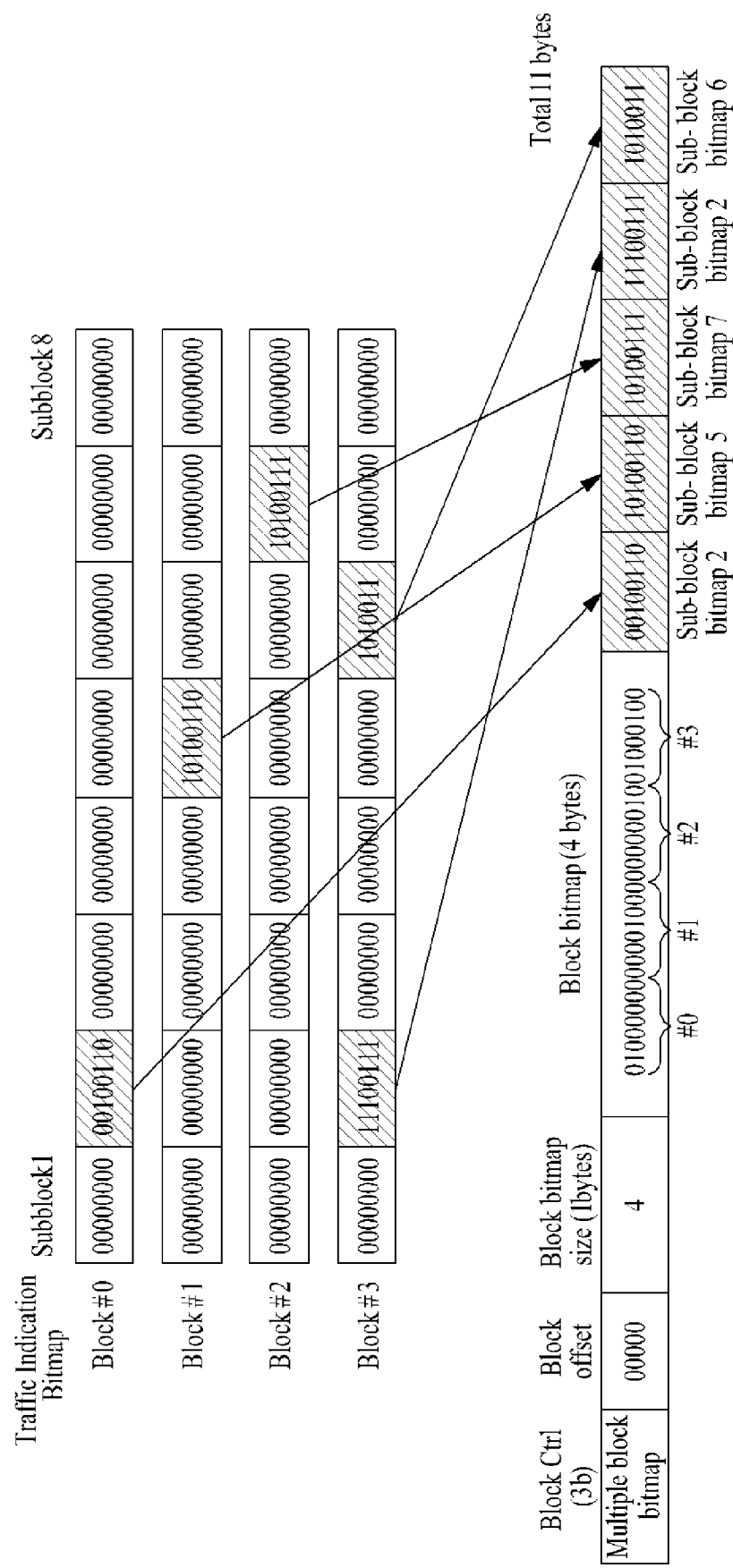
FIG. 32 and FIG. 33 are diagrams for explaining examples of a multiple block bitmap encoding scheme.
Figure 33:
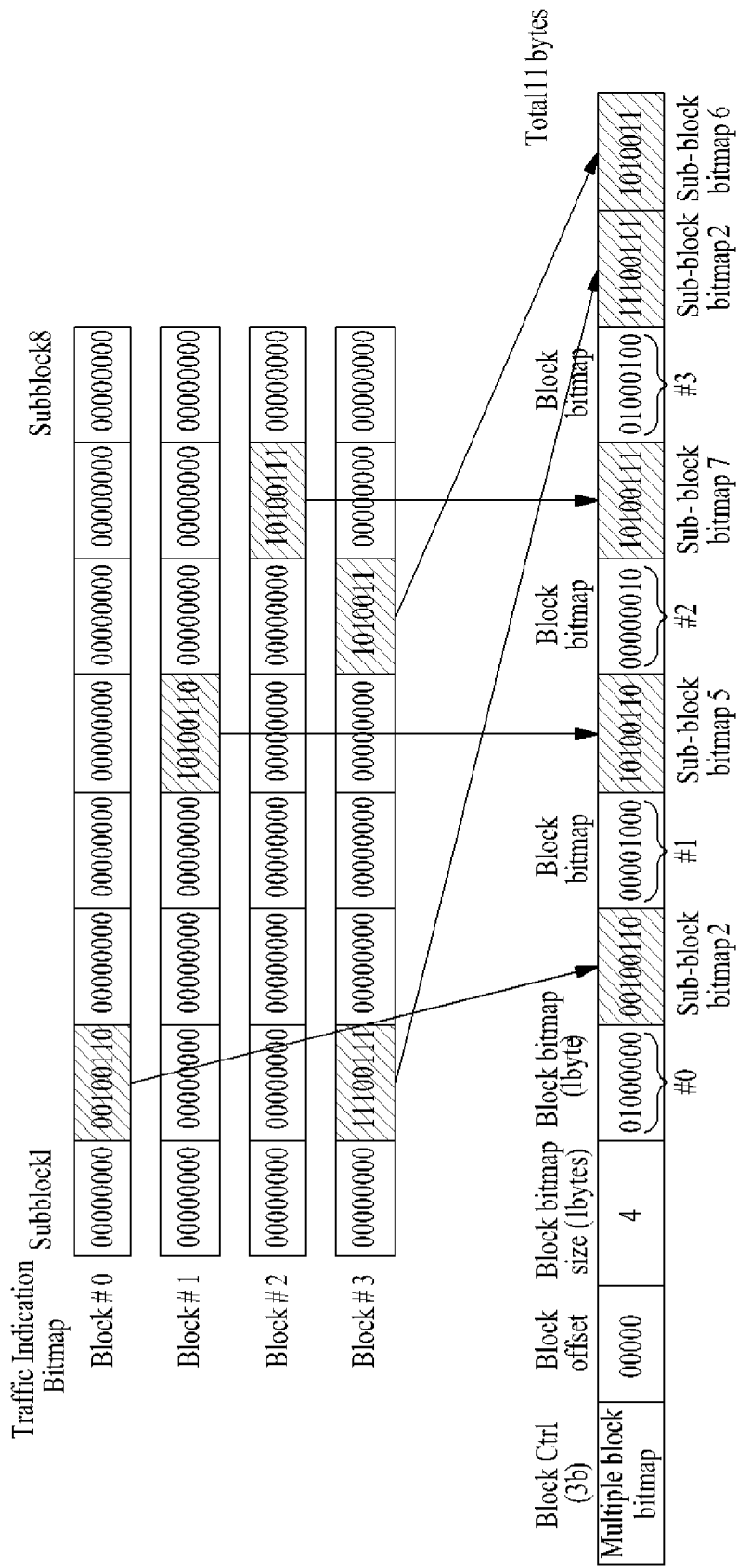

FIG. 32 and FIG. 33 are diagrams for explaining examples of a multiple block bitmap encoding scheme. For clarity of explanation, assume that the TIM element indicates 4 blocks and there is one sub-block including an AID paged in each block.

As shown in FIG. 32, the TIM element, which is used for indicating 4 blocks and applied a multiple bitmap encoding scheme, can include a block control field of 3 bits, a block offset field of 5 bits, a block bitmap size field of 1 byte and a block bitmap field of 2 bytes. In FIG. 32, since the TIM element is used for indicating the 4 blocks, the block bitmap size field can indicate a size of a block bitmap with 1 byte.

Having received the TIM element, an STA decodes the block bitmap size field and may be then able to recognize the size of the block bitmap field and the number of blocks indicated by the TIM element.

As shown in the example of FIG. 32, a block bitmap field of a size indicated by the block bitmap size field can be positioned immediately after the block bitmap size field. As mentioned earlier in FIG. 29 to FIG. 31, the block bitmap field of a size of 4 bytes can indicate a block in 8-bit unit.

The block bitmap size field of 1 byte can be repeatedly positioned one by one. For instance, as shown in an example of FIG. 33, if a size of the block bitmap field indicated by the block bitmap size field corresponds to 4 bytes, the block bitmap field and the sub-block bitmap filed can be repeatedly positioned by four times. In the example shown in FIG. 33, a first block bitmap field (#0) is used for indicating a first block (#0) and a second block bitmap field (#1) can be used for indicating a second block (#1). In particular, an N-th block bitmap field can be used for indicating an N-th block.

Although FIG. 33 shows an example that a size of all sub-block bitmap fields positioned between the block bitmap fields corresponds to 1 byte, the size of the sub-block bitmap fields may vary according to the number of sub-blocks including a paged AID in a block.

In case of using the legacy encoding scheme to indicate the N number of blocks, the TIM element requires a size of N*2 bytes except the sub-block bitmap field. On the contrary, in case of using the multiple block bitmap encoding scheme, the TIM element requires a size of 1 byte (block control field of 3 bits and block offset field of 5 bits)+1 byte (block bitmap size field)+N*1 byte (block bitmap field) except the sub-block bitmap field. Hence, the long block bitmap encoding scheme can obtain a gain of N−2 byte compared to the legacy encoding scheme.

It is not necessary to independently implement the aforementioned embodiment 1 and the embodiment 2. The embodiment 1 and the embodiment 2 can be used in a manner of being combined with each other in a wireless communication system. For instance, an AP usually uses the long block bitmap encoding scheme configured to indicate the N number of blocks determined by a system. If the AP intends to indicate blocks more than the N number of blocks determined by the system by one TIM element, the AP can apply the multiple block bitmap encoding scheme at last.

Figure 34:
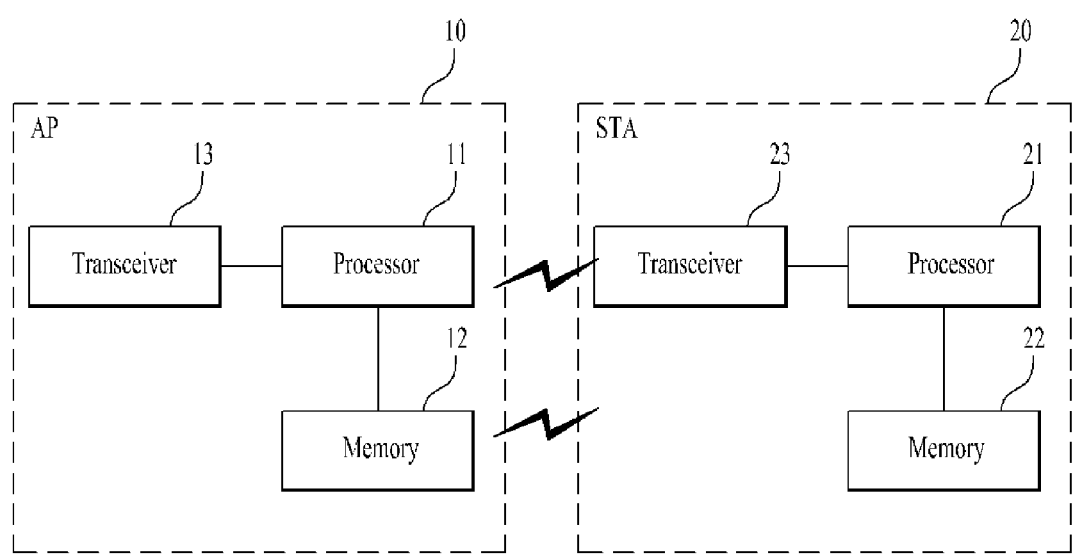
FIG. 34 is a block diagram for a configuration of a wireless device according to one embodiment of the present invention.

FIG. 34 is a block diagram of an example of a wireless device according to one embodiment of the present invention.

Referring to FIG. 34, an AP 10 includes a processor 11, a memory 12 and a transceiver 13. An STA (20) includes a processor 21, a memory 22 and a transceiver 23. The transceiver 13/23 can transmit/receive a radio signal and can implement a physical layer according to IEEE 802 system. The processor 11/21 is connected with the transceiver 13/23 and can implement the physical layer according to IEEE 802 system and/or MAC layer. The processor 11/21 can be configured to perform operations according to the aforementioned various embodiments of the present invention. A module configured to implement operations of the AP and operations of the STA according to the aforementioned various embodiments of the present invention is stored in the memory 12/22 and can be implemented by the processor 11/21. The memory 12/22 is included in the inside of the processor 11/21 or installed in the outside of the processor 11/21 and can be connected with the processor 11/21 by a well-known means.

Specific configuration of the AP and the STA device can be implemented to independently apply the items explained in the aforementioned various embodiments of the present invention or apply two or more embodiment at the same time. For clarity, explanation on duplicated contents is omitted.

Embodiments of the present invention can be implemented using various means. For instance, embodiments of the present invention can be implemented using hardware, firmware, software and/or any combinations thereof.

In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although various embodiments according to the present invention are explained centering on an example applied to IEEE 802.11 system, the present invention can be identically applied to various wireless access systems as well as IEEE 802.11 system.

What is claimed is:

1. A method of transmitting a traffic indication map (TIM) to a station (STA) in a wireless communication system, the method comprising:
   transmitting the TIM to the STA via a beacon frame,
   wherein a partial virtual field of the TIM comprises:
      a block offset field indicating a position of a first block among consecutive N blocks, wherein N is a natural number equal to or greater than 2,
      a block bitmap field identifying one or more sub-blocks in each of the consecutive N blocks, the block bitmap field having a size of N bytes corresponding to the consecutive N blocks,
      for each of the one or more sub-blocks identified in the block bitmap field, a corresponding sub-block bitmap field identifying at least one STA for which there is buffered downlink data, and
      a block bitmap size field indicating a size of the block bitmap field.

2. The method of claim 1, wherein the block bitmap field of 1 byte unit indicates blocks different from each other.

3. The method of claim 1, wherein the N corresponds to a fixed value in the wireless communication system.

4. The method of claim 1, wherein the N corresponds to a value configured by an access point (AP).

5. The method of claim 1, wherein the block bitmap size field indicates the size of the block bitmap field by N bytes.

6. The method of claim 1, wherein the block bitmap field is divided into N block bitmap sub-fields corresponding to blocks different from each other, and wherein each block bitmap sub-field is arranged independently in the TIM.

7. The method of claim 1, wherein the one or more sub-block bitmap fields are arranged in the TIM based on a sequence of the one or more sub-blocks indicated by the block bitmap field.

8. A method of receiving a traffic indication map (TIM), which is received by a station (STA) in a wireless communication system, the method comprising:
   receiving the TIM from an access point (AP) via a beacon frame,
   wherein a partial virtual field of the TIM comprises:
      a block offset field indicating a position of a first block among consecutive N blocks, wherein N is a natural number equal to or greater than 2,
      a block bitmap field identifying one or more sub-blocks in each of the consecutive N blocks, the block bitmap field having a size of N bytes corresponding to the consecutive N blocks, for each of the one or more sub-blocks identified in the block bitmap field, a corresponding sub-block bitmap field identifying at least one STA for which there is buffered downlink data, and a block bitmap size field indicating a size of the block bitmap field.

9. The method of claim 8, wherein the N is a value configured by the access point (AP).

10. The method of claim 8, wherein the block bitmap size field indicates the size of the block bitmap field by N byte.

11. The method of claim 8, wherein the one or more sub-block bitmap fields are arranged in the TIM based on a sequence of the one or more sub-blocks indicated by the block bitmap field.

12. A device transmitting a traffic indication map (TIM) to a station (STA) in a wireless communication system, the device comprising:
   a transceiver configured to transmit and receive a radio signal; and
   a processor that:
   controls the transceiver to transmit the TIM to the STA via a beacon frame,
   wherein a partial virtual field of the TIM comprises:
   a block offset field indicating a position of a first block among consecutive N blocks, wherein N is a natural number equal to or greater than 2,
   a block bitmap field identifying one or more sub-blocks in each of the consecutive N blocks, the block bitmap field having a size of N bytes corresponding to the consecutive N blocks,
   for each of the one or more sub-blocks identified in the block bitmap field, a corresponding sub-block bitmap field identifying at least one STA for which there is buffered downlink data, and
   a block bitmap size field indicating a size of the block bitmap field.

13. A station (STA) device receiving a traffic indication map (TIM) in a wireless communication system, the station device comprising:
   a transceiver that transmits and receives a radio signal; and
   a processor that:
   controls the transceiver to receive the TIM from an access point (AP) via a beacon frame,
   wherein a partial virtual field of the TIM comprises:
   a block offset field indicating a position of a first block among consecutive N blocks, wherein N is a natural number equal to or greater than 2,
   a block bitmap field identifying one or more sub-blocks in each of the consecutive N blocks, the block bitmap field having a size of N bytes corresponding to the consecutive N blocks,
   for each of the one or more sub-blocks identified in the block bitmap field, a corresponding sub-block bitmap field identifying at least one STA for which there is buffered downlink data, and
   a block bitmap size field indicating a size of the block bitmap field.

* * * * *